(12) United States Patent
Yamashita

(10) Patent No.: US 6,321,290 B1
(45) Date of Patent: Nov. 20, 2001

(54) PROGRAM CHECKING METHOD, PROGRAM CHECKING APPARATUS, AND COMPUTER-READABLE RECORDING MEDIUM FOR RECORDING TARGET PROGRAM CHECKING PROGRAM CAPABLE OF REDUCING TRACING INTERRUPT TIME

(75) Inventor: Fumiaki Yamashita, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/300,685

(22) Filed: Apr. 27, 1999

(30) Foreign Application Priority Data

Apr. 28, 1998 (JP) .................................................. 10-118969

(51) Int. Cl.$^7$ ...................................................... G06F 9/38
(52) U.S. Cl. .............................. 711/100; 711/5; 711/101; 711/154; 711/161; 711/162; 712/225
(58) Field of Search ................................. 712/220–229; 711/5, 100, 101, 154, 162

(56) References Cited

U.S. PATENT DOCUMENTS

| | | | |
|---|---|---|---|
| 5,625,785 | * | 4/1997 | Miura et al. .......................... 712/227 |
| 5,680,542 | * | 10/1997 | Mulchandani et al. ................. 714/28 |
| 6,006,033 | * | 12/1999 | Heisch ..................................... 717/9 |
| 6,047,353 | * | 4/2000 | Vishlitzky et al. .................... 711/111 |
| 6,052,700 | * | 4/2000 | Eckard et al. ......................... 708/112 |
| 6,145,123 | * | 11/2000 | Torrey et al. ............................ 717/4 |
| 6,148,381 | * | 11/2000 | Jotwani ................................. 711/158 |
| 6,173,395 | * | 1/2001 | Wisor et al. .......................... 712/236 |
| 6,182,210 | * | 1/2001 | Akkary et al. ........................ 712/235 |

FOREIGN PATENT DOCUMENTS

| | | |
|---|---|---|
| 61-168435 | 10/1986 | (JP) . |
| 63-59640 | 3/1988 | (JP) . |
| 3-3043 | 1/1991 | (JP) . |
| 3-237544 | 10/1991 | (JP) . |
| 5181713 | 7/1993 | (JP) . |
| 6-324916 | 11/1994 | (JP) . |
| 9-259015 | 10/1997 | (JP) . |

* cited by examiner

*Primary Examiner*—Than Nguyen
(74) *Attorney, Agent, or Firm*—Hayes, Soloway, Hennessey, Grossman & Hage, P.C.

(57) ABSTRACT

While shortening a trace processing time duration of checking a target program, the target program is simply checked in a high speed. When historical data acquired by executing this target program is supplied, the historical data is converted into trace packet data. The trace packet data is temporarily stored into a trace packet buffer. When the storage content of the trace packet buffer is brought into an overflow state, the trace packet data and store-impossible data are stored into an external storage apparatus.

35 Claims, 11 Drawing Sheets

Fig.2 (1):
| 07 ~ 04 | 03 ~ 00 | ;bit |
| --- | --- | --- |
| 0000 | TRCODE [3:0] | |

Fig.2 (2):
| 07 ~ 04 | 03 ~ 00 | ;bit |
| --- | --- | --- |
| HD_ADDR [7:4] | TRCODE [3:0] | |

Fig.2 (3):
| 07 | 06 ~ 04 | 03 ~ 00 | ;bit |
| --- | --- | --- | --- |
| TRGR | BE [2:0] | TRCODE [3:0] | |

Fig.2 (4):
| 08 07 ~ 04 | 03 ~ 00 | ;bit |
| --- | --- | --- |
| BRNST [3:0] | TRCODE [3:0] | |

| 39 ~ | |
| --- | --- |
| BB_ADDR [31:0] | |

Fig.2 (5):
| 08 07 ~ 04 | 03 ~ 00 | ;bit |
| --- | --- | --- |
| 0000 | TRCODE [3:0] | |

| 39 ~ | |
| --- | --- |
| AB_ADDR [31:0] | |

Fig.2 (6):
| 08 07 ~ 04 | 03 ~ 00 | ;bit |
| --- | --- | --- |
| 0000 | TRCODE [3:0] | |

| 39 ~ | |
| --- | --- |
| EX_ADDR [31:0] | |

Fig.2 (7):
| 08 07 | 06 ~ 04 | 03 ~ 00 | ;bit |
| --- | --- | --- | --- |
| TRGR | BE [2:0] | TRCODE [3:0] | |

| 39 ~ | |
| --- | --- |
| WR_DATA [31:0] | |

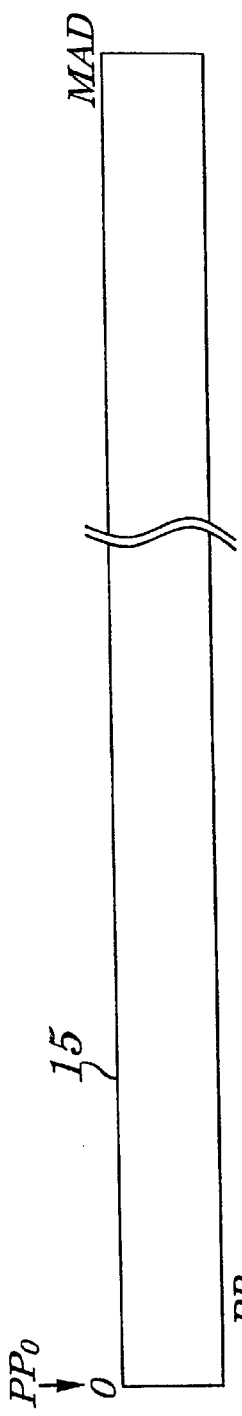
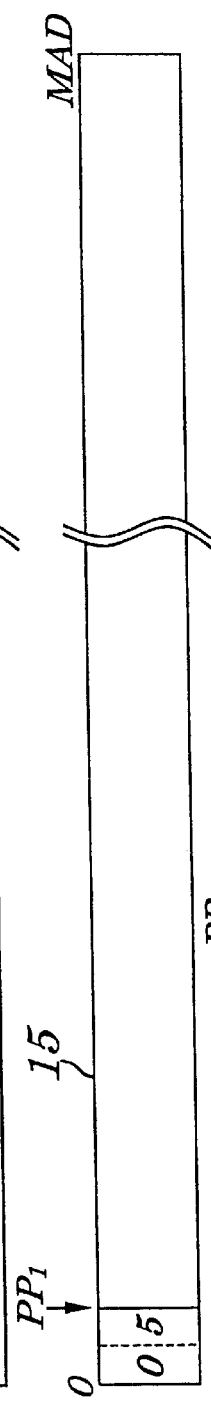
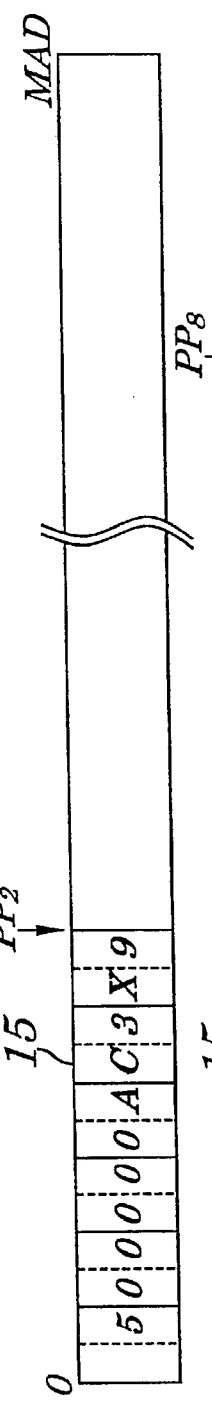
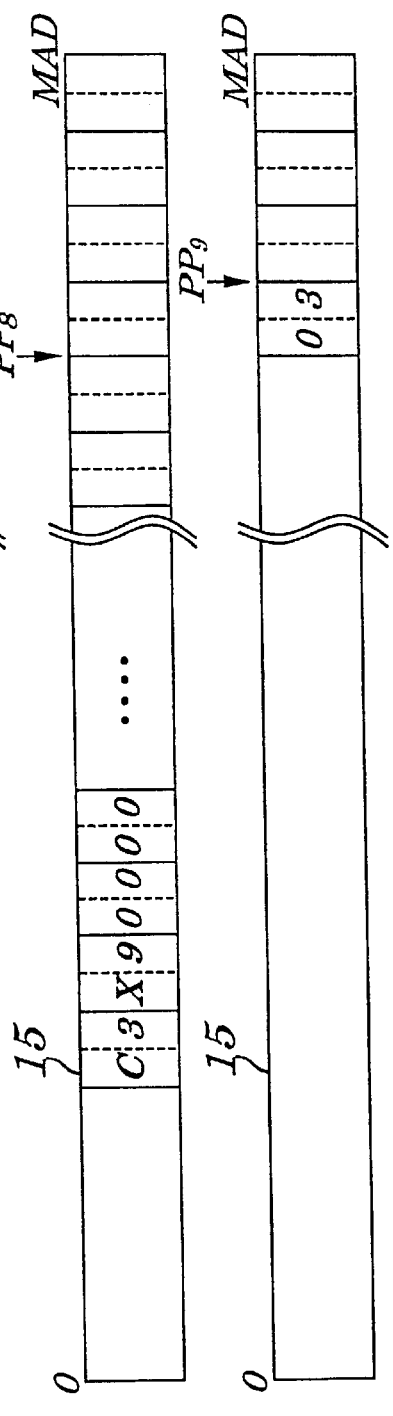
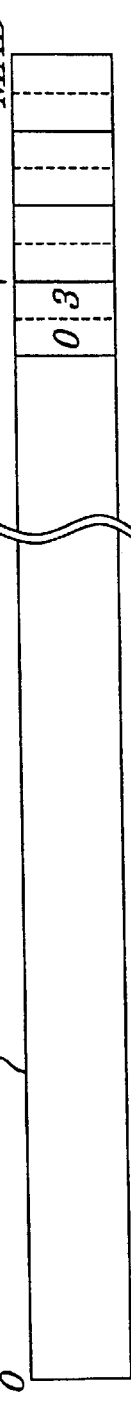
Fig.5 (1)  Fig.5 (2)  Fig.5 (3)  Fig.5 (4)  Fig.5 (5)

PROGRAM CHECKING METHOD, PROGRAM CHECKING APPARATUS, AND COMPUTER-READABLE RECORDING MEDIUM FOR RECORDING TARGET PROGRAM CHECKING PROGRAM CAPABLE OF REDUCING TRACING INTERRUPT TIME

BACKGROUND OF THE INVENTION

1. Field of the Invention

The present invention generally relates to a program checking method, a program checking apparatus, and a computer-readable recording medium for recording thereon a target program checking program. More specifically, the present invention is directed to such program checking method/apparatus capable of checking a target program while reducing total tracing interrupt time, which should be executed by a central processing unit (CPU) for constituting a target system such as a facsimile machine under development and an image processing apparatus under development. Also, the present invention is directed to a computer-readable recording medium for recording thereon such a target program to be executed by this CPU.

2. Description of the Related Art

There is a rare case that a target program installed in a target system is operable under normal condition since this target program has been accomplished. Therefore, usually, a program checking apparatus executes this target program so as to trace contents of this target program step by step, for instance, how the respective instructions (commands) for constituting the target program are executed; how the contents of registers are changed after the respective instructions are executed, and/or how the contents of addresses within a main storage apparatus are changed. Then, the information related to these traced contents (historical information) is acquired to be stored into the external storage apparatus. Thereafter, this target program containing program bugs can be corrected based upon the acquired historical information.

Conventionally, an address bus and a data bus, which are connected to a CPU, are connected with a target program checking apparatus so as to acquire desirable historical information at preset timing. Then, the acquired historical information is stored into a storage apparatus contained in this target program checking apparatus. Very recently, operation capabilities of CPUs are increased, and operation clock frequencies thereof are also increased up to several 100 MHz. When connectors and/or probes of target program checking apparatus are electrically connected to address buses and/or data bus operable in such high frequencies, unwanted stray capacitances are additionally provided with these high-speed address buses/data buses. Therefore, signal waveforms of address signal and/or data signals would be deformed, so that the target system could not be operated under normal condition.

Furthermore, when a cache memory circuit is built in a CPU, an external storage unit is not sometimes accessed. Thus, even when an external address bus and an external data bus are traced, there is such a risk that steps processed by the CPU cannot be completely traced. Under such a reason, a trace means is conventionally provided within a CPU chip, and necessary historical information is outputted via a trace terminal outside the CPU chip.

In general, when a target program checking apparatus is employed, a storage capacity for tracing operation may be increased as large as possible, as compared with a CPU chip having a trace data memory. Moreover, when a high speed memory is employed, a large amount of historical information may be acquired. However, when such a trace information storage unit is provided inside a CPU chip and a storage capacity thereof is increased, cost of this CPU chip is increased. Therefore, this measure does not constitute merits. On the other hand, when a total number of tracing terminals is increased so as to acquire data in high speed, a dimension of an IC chip package is increased, result in one of demerits.

As a consequence, it is practically difficult to determine how such historical information can be acquired in a high efficiency with using a limited storage capacitance for storing historical information, and a limited number of tracing terminals.

One typical conventional program checking apparatus has been proposed. That is, as indicated in FIG. 11, this target program checking apparatus is mainly arranged by a target memory unit 1, a CPU chip 2, and an external storage apparatus 3. The target memory unit 1 is a memory functioning as a main storage apparatus of a target system, and is arranged by a target program storage unit 1*a* for storing thereinto a target program to be checked by a CPU, and a data storage unit 1*b* for storing thereinto data used while this target program is executed.

The CPU chip 2 is mainly arranged by a target register unit 4, a CPU 5, a trace means 6, and a trace buffer 7. The target register unit 4 is realized by simulating a register used by the CPU chip 2. This target register unit 4 is constituted by a plurality of registers. The CPU 5 controls various structural elements employed in the conventional program checking apparatus, and also sequentially executes the target program. The trace means 6 traces one by one the execution sequence of the respective instructions for constituting the target program, and the change states in the storage contents of the target register unit 4 after the respective instructions are executed so as to acquire historical information related to these traced results. Thereafter, the trace means 6 stores the historical information into the external storage apparatus 3. As the historical information, for instance, there are an address of a destination on the target program storage unit 1*a* as a condition branch instruction; an address of a jump destination on the target program storage unit 1*a* as a jump instruction; and an address of data loaded to the target register unit 4 on the data storage unit 1*b* as a data load instruction. The trace buffer 7 owns a preselected storage capacity. The historical information is sequentially stored into this trace buffer 7 in a cyclic manner. The external storage apparatus 3 is constituted by such a storage medium having a large storage capacity, for instance, a semiconductor memory such as a RAM, a floppy disk (FD), and a hard disk (HD). The historical information is stored into this external storage apparatus 3.

Next, a description is made of the operations of the above-described conventional program checking apparatus. The CPU 5 sequentially reads the respective commands/instructions for constituting this target program from the target program storage unit 1*a*, and interprets any of the instructions/commands. For example, the respective commands are executed in such a manner that the data stored in the data storage unit 1*b* is loaded on the target register unit 4. As a result, the trace means 6 traces in the unit of one step the execution sequence of the respective instructions, and also the state changes in the storage contents of the target register unit 4. Then, this trace means 6 acquires the historical information related to these traced events, and sequentially stores the acquired historical information into the trace the trace buffer 7.

When the trace means 6 repeatedly performs the above-described process operations and therefore, the trace buffer 7 will overflow, the trace means 6 requests the CPU 5 to once stop the program processing operation under execution, during which all of the historical information stored in the trace buffer 7 is stored into the external storage apparatus 3. Thereafter, when the transfer buffer 7 becomes empty, the trace operation is restarted.

In the above-described conventional program checking apparatus, since the operation of this CPU 5 is stopped every time the trace buffer 7 is brought into the overflow operation, this program checking apparatus cannot be applied to such a target program checking operation that the program checking operation should be carried out in real time. For instance, in the case that a program developed for controlling an engine of an automobile is checked, such information for indicating how degree a car driver pushes an acceleration pedal, or what revolution number of this engine is counted, or what temperature becomes is entered into the CPU. This CPU controls a fuel supply amount and fuel supply timing based on this information. A program developing engineer actuates the engine so as to obtain an optimum fuel supply amount by changing various parameters which are set to the CPU. At this time, this program developing engineer progresses this development by confirming how the program is processed within the CPU, and which parameters are used.

When the historical information is acquired by the conventional program checking apparatus in such a manner that the program processing operation is once stopped, the engine is also stopped, so that the historical information under actual use condition could not be acquired.

To avoid this problem, one solution method has been described in Japanese Patent Application Laid-open No. Hei-5-181713. That is, the historical information may be acquired only when the program is ended under abnormal condition. However, this conventional acquiring method cannot acquire the contents of the resisters operated under normal operation, so that the program developing engineer could not grasp how the CPU is operated with parameters.

SUMMARY OF THE INVENTION

The present invention has been made to solve the above-explained problems, and therefore, has a first object to provide a program checking method, a program checking apparatus, and a target program checking program, by which historical information required to check a target program can be acquired without stopping a CPU operation during a trace processing operation.

A second object of the present invention is to provide a program checking method, a program checking apparatus, by which trace interrupt time duration can be shortened while using a minimum trace storage capacity contained in a CPU, and also a trace interrupt program portion can be specified. As a result, the target program can be simply checked in high speed.

To achieve the above-described first and second objects, a program checking apparatus, according to a first aspect of the present invention, is featured by such a program checking apparatus for executing a target program so as to acquire historical data produced by executing the target program and for checking the target program based upon the acquired historical data, the target program being originally executed by a central processing unit for constituting a system under development, comprising:

first and second storage means for storing thereinto the historical data; and trace means operable in such a case that the target program is executed by the program checking apparatus to thereby acquire the historical data in such a manner that when the first storage means owns a storage capacity capable of storing the historical data, the trace means causes the first storage means to temporarily store thereinto the acquired historical data; when the first storage means does not have the storable storage capacity, the trace means reads all of the historical data stored in the first storage means and then causes the second storage means to store thereinto all of the read historical data, and thereafter stores store-impossible information into the first storage means, the store-impossible information indicating that the historical data itself cannot be stored into the first storage means; and when the acquired historical data is not supplied to the trace means, the trace means reads both the historical data and the store-impossible information stored in the first storage means to thereby store both data into the second storage means.

The program checking apparatus, according to the first aspect of the present invention, is featured by further comprising: a target memory unit constituted by a target program storage unit for storing thereinto said target program, and a data storage unit for storing thereinto program execution data.

The program checking apparatus, according to the first aspect of the present invention, is featured by that said first storage means is constituted by a trace buffer register; said second storage means is constituted by an external storage apparatus; and said trace means and the trace buffer register are built in a CPU (central processing unit) chip.

The program checking apparatus, according to the first aspect of the present invention, is featured by that said trace means acquires said historical data, and converts the acquired said historical data into a trace packet, and also causes said trace buffer register to store thereinto said trace packet.

The program checking apparatus, according to the first aspect of the present invention, is featured by that said trace means converts the acquired historical data into a plurality of trace packets, and each of said plural trace packets is made of plural bits.

Also, a program checking apparatus, according to a second aspect of the present invention, is featured by such a program checking apparatus for executing a target program so as to acquire historical data produced by executing the target program and for checking the target program based upon the acquired historical data, the target program being originally executed by a central processing unit for constituting a system under development, comprising:

first and second storage means for storing thereinto the historical data; and trace means operable in such a case that the target program is executed by the program checking apparatus to thereby acquire the historical data in such a manner that when the first storage means owns a first storage capacity capable of storing the historical data, the trace means causes the first storage means to temporarily store thereinto the acquired historical data; when the first storage means does not have the first storage capacity, but owns a second storage capacity capable of storing storage-impossible information, the trace means causes the first storage means to temporarily store thereinto the storage-impossible information, the store-impossible information indicating that the historical data itself cannot be stored into the first storage means; and when the first storage means does not have even the second storage capacity, the trace means is brought into a wait state until the second storage capacity can be secured therein, and thereafter causes the first storage means to store thereinto the storage-impossible information, and also reads both the historical data and the store-impossible information stored in the first storage means to thereby store both data into the second storage means.

Also, a program checking apparatus, according to a third aspect of the present invention, is featured by such a program checking apparatus for executing a target program so as to acquire historical data produced by executing the target program and for checking the target program based upon the acquired historical data, the target program being originally executed by a central processing unit for constituting a system under development, comprising:

first and second storage means for storing thereinto the historical data; and trace means operable in such a case that the target program is executed by the program checking apparatus to thereby acquire the historical data in such a manner that when the first storage means owns a first storage capacity capable of storing the historical data, the trace means causes the first storage means to temporarily store thereinto the acquired historical data; when the first storage means does not have the first storable storage capacity, but owns a second storage capacity capable of storing storage-impossible information, the trace means causes the first storage means to temporarily store thereinto the storage-impossible information, the store-impossible information indicating that the historical data itself cannot be stored into the first storage means; and when the first storage means does not have even the second storage capacity, the trace means reads both the historical data and the store-impossible information from the first storage means until the first storage means can own the second storage capacity, and then stores both the read historical data and store-impossible information into the second storage means; and thereafter when the acquired historical data is not supplied to the trace means, the trace means reads both the historical data and the store-impossible information stored in the first storage means to thereby store both data into the second storage means.

The program checking apparatus, according to the second, or third aspect of the present invention, is featured by that:

the first storage means is arranged by series-connecting a plurality of shift registers to each other, the shift registers being constituted by series-connecting a plurality of flip-flops to each other; and the trace means includes at least:

a comparing unit for comparing bit lengths of the historical data and of the store-impossible information with a pointer in order to judge as to whether or not both the historical data and the storage-impossible information can be stored into the first storage means, the pointer indicating an address of a least significant bit of information which should be subsequently stored into the first storage means.

Also, the program checking apparatus, according to the second, or third aspect of the present invention, is featured by that:

said trace means acquires said historical data, and converts said acquired historical data into a trace packet, and also causes said series-connected shift registers to store thereinto said trace packet.

Also, the program checking apparatus, according to the second, or third aspect of the present invention is featured by that:

said trace means converts the acquired historical data into a plurality of trace packets, and each of said plural trace packets is made of plural bits.

Also, the program checking apparatus, according to the second, or third aspect of the present invention, is featured by further comprising:

a target memory unit constituted by a target program storage unit for storing thereinto said target program, and a data storage unit for storing thereinto program execution data.

Further, a target program checking method, according to a fourth aspect of the present invention, is featured by such a method for checking a target program by using a program checking apparatus having first and second storage means, for executing the target program so as to acquire historical data produced by executing the target program and for checking the target program based upon the acquired historical data, the target program being originally executed by a central processing unit for constituting a system under development, comprising:

a first step where when the first storage means owns a storage capacity capable of storing the historical data, the acquired historical data is temporarily stored into the first storage means;

a second step where when the first storage means does not have the storable storage capacity, all of the historical data stored in the first storage means are read from first storage means to be stored into the second storage means, and thereafter store-impossible information is stored into the first storage means, the store-impossible information indicating that the historical data itself cannot be stored into the first storage means; and a third step where when the historical data is not supplied, both the historical data and the store-impossible information are read out from the first storage means to be stored into the second storage means.

Further, a target program checking method, according to a fifth aspect of the present invention, is featured by such a method for checking a target program by using a program checking apparatus having first and second storage means, for executing the target program so as to acquire historical data produced by executing the target program and for checking the target program based upon the acquired historical data, the target program being originally executed by a central processing unit for constituting a system under development, comprising:

a first step where when the first storage means owns a first storage capacity capable of storing the historical data, the acquired historical data is temporarily stored into the first storage means;

a second step where when the first storage means does not have the first storable storage capacity, but owns a second storage capacity capable of storing store-impossible information, the store-impossible information is temporarily stored into the first storage means, the store-impossible information indicating that the historical data itself cannot be stored into the first storage means;

a third step where when the first storage means does not have even the second storage capacity, the first storage means is brought into a wait state until the second storage capacity can be secured therein, and thereafter, the store-impossible information is stored into the first storage means; and a fourth step where both the historical data and the store-impossible information are read out from the first storage means to be stored into the second storage means.

Further, a target program checking method, according to a sixth aspect of the present invention, is featured by such a method for checking a target program by using a program checking apparatus having first and second storage means, for executing the target program so as to acquire historical data produced by executing the target program and for checking the target program based upon the acquired historical data, the target program being originally executed by a central processing unit for constituting a system under development, comprising:

a first step where when the first storage means owns a first storage capacity capable of storing the historical data, the acquired historical data is temporarily stored into the first storage means;

a second step where when the first storage means does not have the first storable storage capacity, but owns a second storage capacity capable of storing store-impossible information, the store-impossible information is temporarily stored into the first storage means, the store-impossible information indicating that the historical data itself cannot be stored into the first storage means;

a third step where when the first storage means does not have even the second storage capacity, both the historical data and the store-impossible information are read out from the first storage means to be thereafter stored into the second storage means until the second storage capacity can be secured in the first storage means; and a fourth step where when the historical data is not supplied, both the historical data and the store-impossible information are read out from the first storage means to be stored into the second storage means.

Also, the target program checking method, according to the fourth, fifth, and sixth aspects of the present invention, is featured by further comprising:

a fourth step for converting said acquired historical data into a trace packet to be stored into said first storage means.

Also, the target program checking method, according to the fourth, fifth, and sixth aspects of the present invention, is featured by further comprising:

a fourth step for converting said acquired historical data into a plurality of trace packets, each of said plural trace packets being made of plural bits.

Also, the target program checking method, according to the fourth, fifth, and sixth aspects of the present invention, is featured by that said historical data is constituted by an address of a branch source and an address of a branch destination when each of interrupt, exception, and branch occurs; an accessed data value; and an address where the data is stored.

Also, the target program checking method, according to the fourth, fifth, and sixth aspects of the present invention, is featured by that said historical data is replaced by a code indicative of a sort of the historical data;

said store-impossible information is replaced by a code indicative of said store-impossible information.

Moreover, a computer-readable recording medium, according to a seventh aspect of the present invention, is featured by such a computer-readable recording medium for recording thereon a target program checking program, wherein:

the target program checking program is checked by a program checking apparatus for executing a target program so as to acquire historical data produced by executing the target program and for checking the target program based upon the acquired historical data, the target program being originally executed by a central processing unit for constituting a system under development, comprising:

first and second storage means for storing thereinto the historical data; and trace means operable in such a case that the target program is executed by the program checking apparatus to thereby acquire the historical data in such a manner that when the first storage means owns a storage capacity capable of storing the historical data, the trace means causes the first storage means to temporarily store thereinto the acquired historical data; when the first storage means does not have the storable storage capacity, the trace means reads all of the historical data stored in the first storage means and then causes the second storage means to store thereinto all of the read historical data, and thereafter stores store-impossible information into the first storage means, the store-impossible information indicating that the historical data itself cannot be stored into the first storage means; and when the acquired historical data is not supplied to the trace means, the trace means reads both the historical data and the store-impossible information stored in the first storage means to thereby store both data into the second storage means.

Moreover, a computer-readable recording medium, according to an eighth aspect of the present invention, is featured by such a computer-readable recording medium for recording thereon a target program checking program, wherein:

the target program checking program is checked by a program checking apparatus for executing a target program so as to acquire historical data produced by executing the target program and for checking the target program based upon the acquired historical data, the target program being originally executed by a central processing unit for constituting a system under development, comprising:

first and second storage means for storing thereinto the historical data; and trace means operable in such a case that the target program is executed by the program checking apparatus to thereby acquire the historical data in such a manner that when the first storage means owns a first storage capacity capable of storing the historical data, the trace means causes the first storage means to temporarily store thereinto the acquired historical data; when the first storage means does not have the first storage capacity, but owns a second storage capacity capable of storing storage-impossible information, the trace means causes the first storage means to temporarily store thereinto the storage-impossible information, the store-impossible information indicating that the historical data itself cannot be stored into the first storage means; and when the first storage means does not have even the second storage capacity, the trace means is brought into a wait state until the second storage capacity can be secured therein, and thereafter causes the first storage means to store thereinto the storage-impossible information, and also reads both the historical data and the store-impossible information stored in the first storage means to thereby store both data into the second storage means.

Moreover, a computer-readable recording medium, according to seventh aspect of the present invention, is featured by such a computer-readable recording medium for recording thereon a target program checking program, wherein:

the target program checking program is checked by a program checking apparatus for executing a target program so as to acquire historical data produced by executing the target program and for checking the target program based upon the acquired historical data, the target program being originally executed by a central processing unit for constituting a system under development, comprising:

first and second storage means for storing thereinto the historical data; and trace means operable in such a case that the target program is executed by the program checking apparatus to thereby acquire the historical data in such a manner that when the first storage means owns a first storage capacity capable of storing the historical data, the trace means causes the first storage means to temporarily store thereinto the acquired historical data; when the first storage means does not have the first storable storage capacity, but owns a second storage capacity capable of storing storage-impossible information, the trace means causes the first storage means to temporarily store thereinto the storage-impossible information, the store-impossible information indicating that the historical data itself cannot be stored into the first storage means; and when the first storage means does not have even the second storage capacity, the trace means reads both the historical data and the store-impossible information from the first storage means until the first storage means can own the second storage capacity, and then stores both the read historical data and store-impossible information into the second storage means; and thereafter when the acquired historical data is not supplied to the trace means, the trace means reads both the historical data and the store-impossible information stored in the first storage means to thereby store both data into the second storage means.

In accordance with the present invention, the historical information or the historical data required to check the target program can be acquired without stopping the operation of the CPU for the trace processing operation.

In addition, while using a minimized trace storage capacity of the memory built in the CPU, the trace interrupt time duration can be shortened, and also, the trace interrupt program portion can be specified. As a consequence, the target program can be quickly checked in a simple manner.

BRIEF DESCRIPTION OF THE DRAWINGS

The above and other objects, advantages and features of the present invention will be more apparent from the following description taken in conjunction with the accompanying drawings in which:

FIG. 2 illustratively indicates a format of 7 sorts of trace packets;

FIG. 5 illustratively represents an example of trace packet storage states in a trace buffer employed in the program checking apparatus of the first embodiment;

DETAILED DESCRIPTION OF THE PREFERRED EMBODIMENTS

Referring to drawings, various preferred embodiments of the present invention will be described in detail.

OVERALL ARRANGEMENT OF FIRST PROGRAM CHECKING APPARATUS

Figure 1:
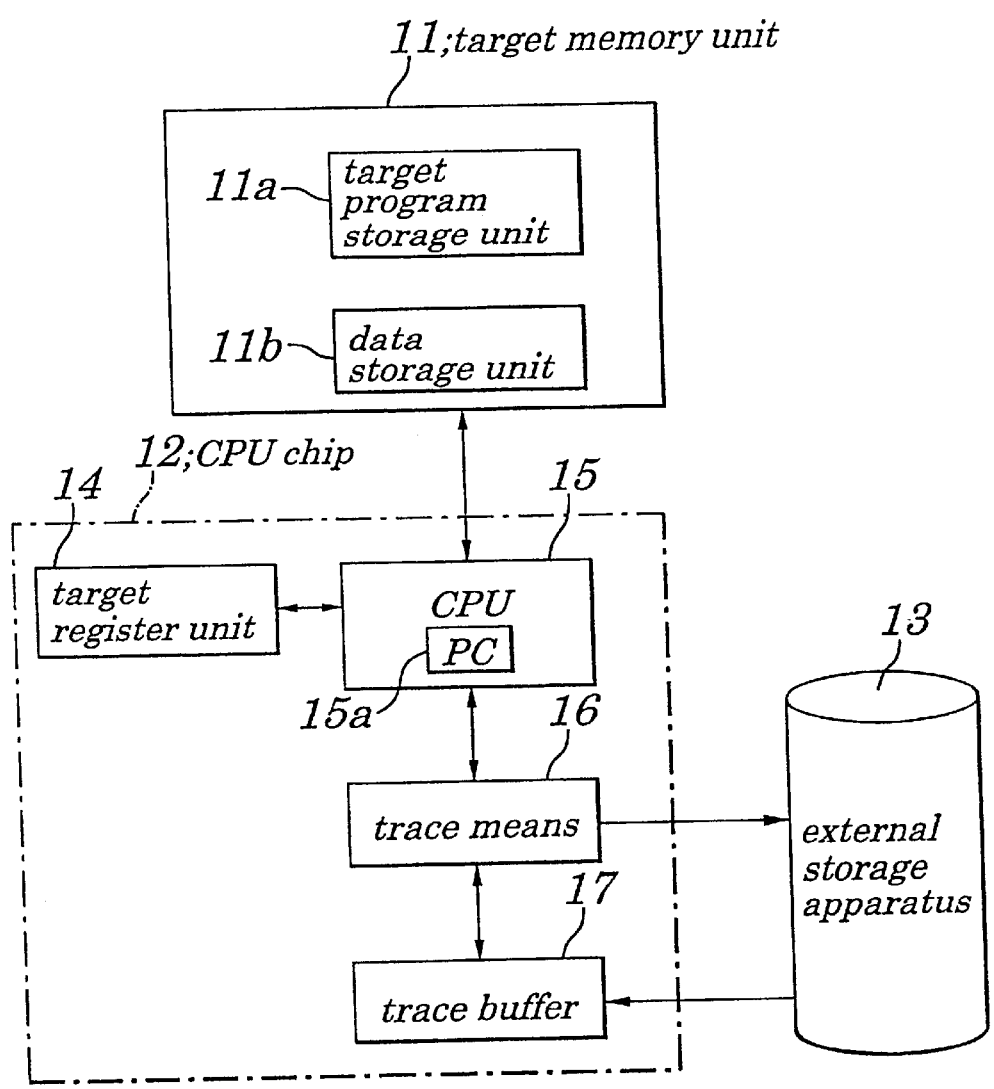
FIG. 1 is a schematic block diagram for showing an electronic arrangement of a program checking apparatus according to a first embodiment of the present invention.

FIG. 1 is a schematic block diagram for showing an overall arrangement of a program checking apparatus according to a first embodiment of the present invention.

This first program checking apparatus is mainly arranged by a target memory unit 11, a CPU (Central processing unit) 12, and an external storage apparatus 13.

The target memory unit 11 is a memory constructed by simulating a main storage apparatus of a target system (i.e., system under development). This target memory unit 11 is arranged by both a target program storage unit 11a for storing thereinto a target program, i.e. a program under development) to be executed by the CPU chip 12, and a data storage unit 11b for storing various data used while the target program is executed.

The CPU chip 12 is mainly arranged by a target register unit 14, a CPU 15, a trace means 16, and a trace buffer 17. The target register unit 14 is realized by simulating a register used by the CPU chip 12. This target register unit 14 is constituted by a plurality of registers. The CPU 15 contains a program counter (PC) 15a, and controls various structural elements employed in the first program checking apparatus, and also sequentially executes the target program. The PC 15a stores a value of an address which should be executed by the CPU 15 during next execution cycle. Also, this PC 15a sequentially counts up a count value every time each of commands is executed, and loads an address of a jump destination.

The trace means 16 traces one by one the execution sequence of the respective instructions for constituting the target program, and the change states in the storage contents of the target register unit 14 after the respective instructions are executed so as to acquire historical information related to these traced results. Furthermore, this trace means 16 converts the acquired historical information into a trace packet "TP", and once stores this trace packet TP into the trace buffer 17. Thereafter, the trace means 16 stores this trace packet TP into the external storage apparatus 13. The trace buffer 17 owns a storage capacity of 320 bits. The trace packet TP is sequentially stored into this trace buffer 17 in a cyclic manner. The external storage apparatus 13 is constituted by such a storage medium having a large storage capacity, for instance, a semiconductor memory such as a RAM, a floppy disk (FD), and a hard disk (HD). The trace packet TP is stored into this external storage apparatus 13.

CONTENT OF TRACE PACKET TP

Next, a description is made of the contents of the above-described trace packet TP. In this first embodiment, as indicated in FIG. 2, the historical information is converted by the trace means 16 into 7(seven) sorts of trace packets TPs which are constituted by either 8 bits or 40 bits. FIG. 2(1) represents a format of such a trace packet TP which indicates a commencement (trace code TRCODE[0101]b) of a trace, an execution (trace code TRCODE[0010]b) of an instruction (command), and an overflow (trace code TRCODE[0011]b) of the trace buffer 17, respectively. It should be understood that numeral number "0101" of this trace code TRCODE[0101]b is expressed by the binary number, namely symbol "[ ]b" denotes numerals indicated by the binary number. The instruction of the trace code TRCODE[0010]b is set by a user, and stored at an address of the target program storage unit 11a. A bit length of the trace packet TP having this format is 8 bits. It should also be noted that the trace packet TP of the trace code TRCODE [0011]b among these trace packets TPs will be referred to as an "overflow packet OFP" hereinafter.

FIG. 2(2) shows a format of another trace packet TP which indicates an interrupt (maskable interrupt) (trace code TRCODE[1100]b), and an address (handler address) HD-ADDR of a handler region, respectively. In this maskable interrupt, an externally supplied interrupt signal can be invalidated. In this handler region, process routines of branched destinations are collected in such a case that branches occurred in a routine due to an occurrence of such an interrupt that an externally supplied interrupt signal cannot be invalidated (non-maskable interrupt), and also an occurrence of an execution (trace code TRCODE[1101]b). A bit length of the trace packet TP having this format is 8 bits.

FIG. 2(3) shows a format of another trace packet TP which indicates such a fact that in order to read data, the CPU 15 constitutes the target register unit 14, and selects any one of two registers used to read/write data, and then accesses with respect to an address of the data storage unit 11b, which is set in the selected register. A bit length of the trace packet TP having this format is 8 bits, and the trace code TRCODE is [0001]b. Symbol TRGR denotes a signal for indicating that the CPU 15 selects any one of the above-explained two registers. Furthermore, symbol BE[2:0] indicates a byte enable signal for indicating a valid byte within a data bus (not shown) provided between the CPU 15 and the target memory unit 11.

FIG. 2(4) indicates a format of another trace packet TP which indicates address BB-ADDR (namely, count value of PC 15a) of branched sources when a branch occurs in a routine in response to each sort of branch instruction.

A bit length of the trace packet TP having this format is 40 bits, and a trace code TRCODE is [0110]b. As the branch instruction(command), the following instructions are involved: the normal jump command (instruction); a jump link command by which an address of a branch source is saved into a specific register for constructing the target register unit 14 and thereafter jumps; a relative instruction command by which an address of a branch destination is expressed by a relative address defined from an address of the present time; a recovery command recovered from various sorts of interrupt/exception process routine; and a register indirect branch command by which after an address of a branch destination has been determined with reference to a certain register for constituting the target register unit 14, this address jumps, in addition to the above-explained maskable interrupt, non-maskable interrupt, and exception.

FIG. 2(5) represents a format of another trace packet TP which indicates an address AB-ADDR (namely, count value of PC 13a) of a branch destination which should be branched when the branches occur in response to the above-described recovery command (trace code TRCODE[1010]b) and the register indirect branch command (trace code TRCODE [1011]b). A bit length of the trace packet TP having this format is 40 bits.

FIG. 2(6) shows a format of another trace packet TP which indicates an execution address EX-ADDR (namely, count value of PC 15a) when a trace is forcibly commenced. A bit length of the trace packet TP having this format is 40 bits, and a trace code TRCODE is [1000]b.

FIG. 2(7) shows a format of another trace packet TP which indicates such a fact that in order to write data WR-DATA, the CPU 15 constitutes the target register unit 14, and selects any one of two registers used to read/write data, and then accesses with respect to an address of the data storage unit 11b, set in the selected register. A bit length of the trace packet TP having this format is 40 bits, and the trace code TRCODE is [1001]b. Furthermore, Symbol BE[2:0] similarly indicates a byte enable signal for indicating a valid byte within a data bus (not shown) provided between the CPU 15 and the target memory unit 11.

CHECKING OPERATION OF FIRST PROGRAM CHECKING APPARATUS

Figure 3:
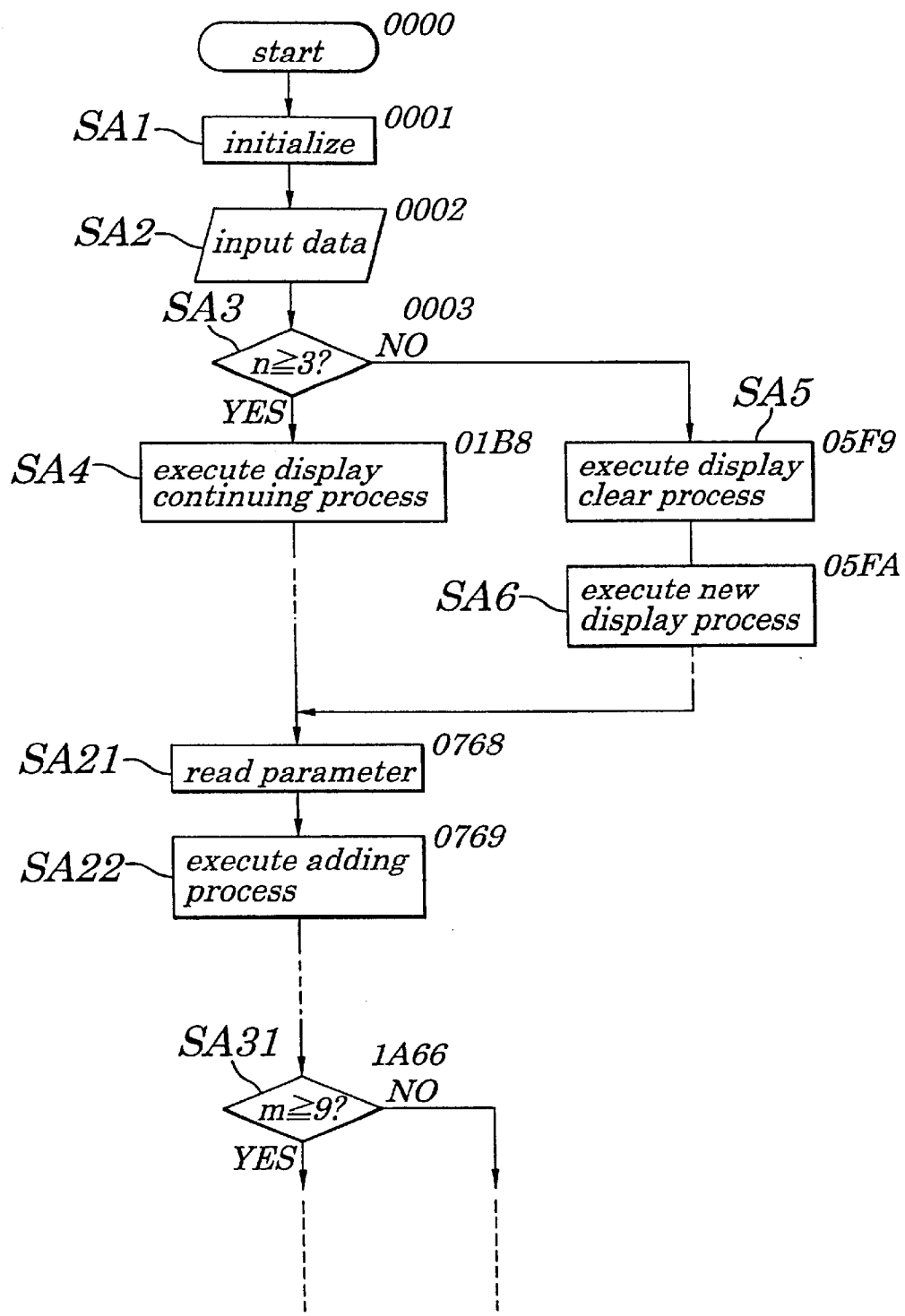
FIG. 3 is a flow chart corresponding to a portion of a target program.
Figure 4:
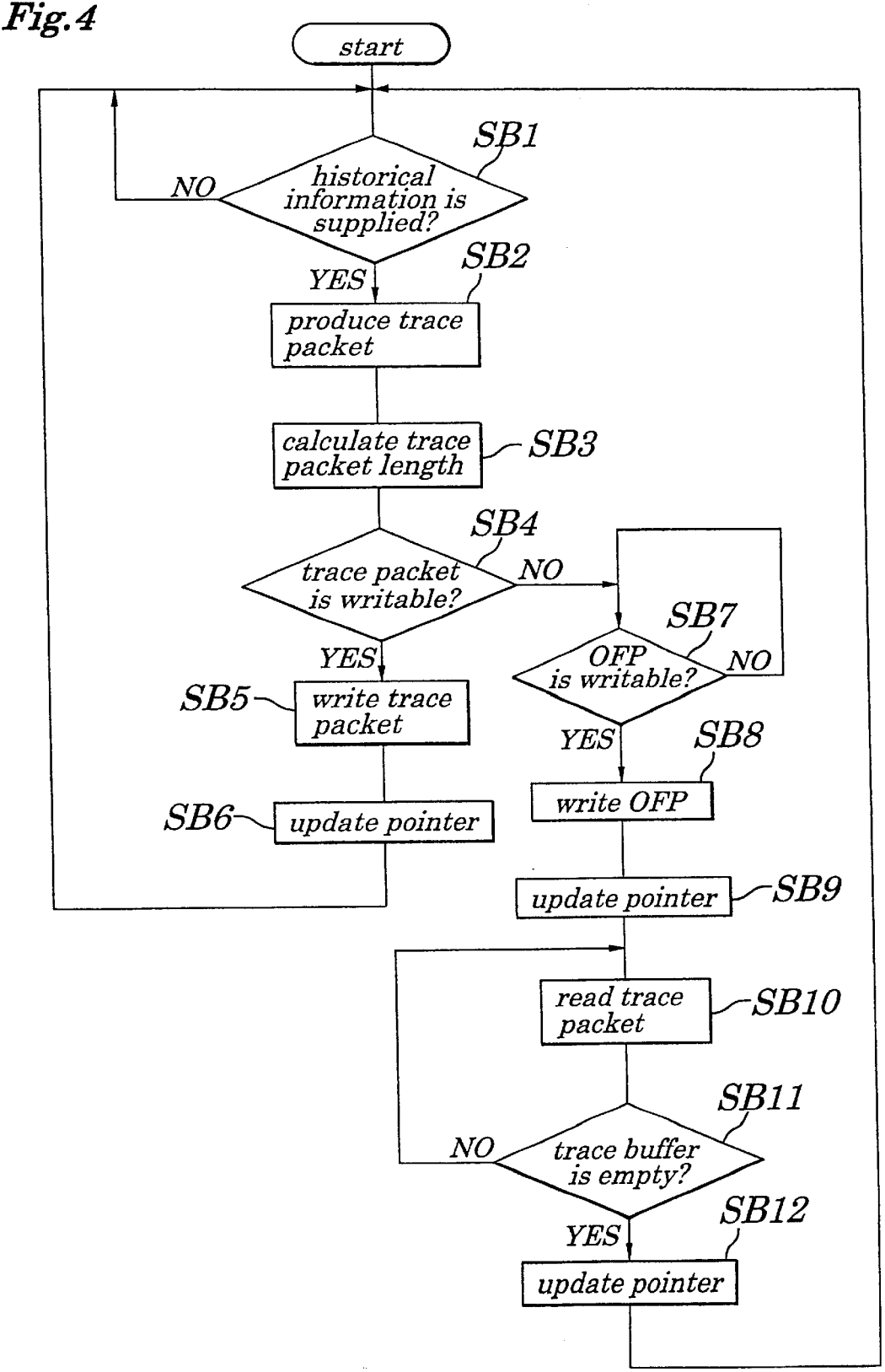
FIG. 4 is flow chart for describing operations of trace means employed in the program checking apparatus of the first embodiment.

Next, checking operation of the first program checking apparatus with employment of the above-described arrangement will be explained with reference to FIG. 3 to FIG. 5. In this first embodiment, it should be understood that a target program which should be checked by this first program checking apparatus corresponds to a flow chart shown in FIG. 3. In FIG. 3, 4-bit numerals indicated by way of the hexadecimal notation and written near upper right portions of the respective process steps represent count values of PC 15a at time instants when the CPU 15 executes the respective process operations.

After the CPU 15a resets the count value of the PC 15a to [0000]h, this CPU 15a commences the execution of this target program. Symbol "[ ]h" indicates that numeral value shown in this blank is expressed by way of the hexadecimal notation. First, when the PC 15a counts up this count value from [0000]h to [0001]h, the checking operation is advanced to a step SA1 of FIG. 3. At this step SA1, the CPU 15 executes an initializaiton operation as follows. That is, the CPU 15 reads out an initializing command stored at an address of the target program storage unit 11a so as to interpret this initializing command. This address corresponds to the count value [0001]h. Then, the CPU 15 resets a plurality of registers which constitute the target register unit 14, and also resets various sorts of flags.

Next, when the PC 15a counts up the count value thereof from [0001]h to [0002]h, the process operation is advanced to a step SA2. At this step SA2, the CPU 15 reads a data input command stored at an address of the target program storage unit 11a, which corresponds to this counted-up value of [0002]h. Then, the CPU 15 interprets this data input command, so that data stored in a certain storage area of the data storage unit 11b as an entry of data from a data input means (not shown) is loaded on a predetermined register for constituting the target register unit 14. In this case, it is now assumed that data having a value of [0AC3]h is entered. Subsequently, when the PC 15a counts up the count value thereof from [0002]h to [0003]h, the process operation is advanced to a step SA3. At this step SA3, the CPU 15 reads a condition branch command stored at an address of the target program storage unit 11a, which corresponds to this counted-up value of [0003]h. Then, the CPU 15 judges as to whether or not a variable "n" is larger than, or equal to 3. In this case, this condition branch command is assumed as the below-mentioned command. That is to say, when the variable "n" becomes larger than, or equal to 3, the process operation jumps to a display continuing process command stored at an address of the target program storage unit 11a, which corresponds to a count value [01B8]h of the PC 15a, whereas when the variable "n" is smaller than 3, the process operation jumps to a display clear command at an address of the target program storage unit 11a, which corresponds to a count value [05F9]h of the PC 15a.

When the judgement result of the step SA3 becomes "YES", namely when the variable "n" is larger than, or equal to 3, the CPU 15 changes the count value of the PC 15a from [0003]h to [01B8]h, and thereafter the process operation is advanced to a further step SA4. At this step SA4, the CPU 15 reads a display process command stored at an address of the target program storage unit 11a, which corresponds to the count value [01B8]h of the PC 15a, to interpret this display process command. Then, the CPU 15 executes the display continuing process in such a manner that a content displayed on a display unit (not shown) is directly continued.

On the other hand, when the judgement result of the step SA3 becomes "NO", namely when the variable "n" is smaller than 3, the CPU 15 changes the count value of the PC 15a from [0003]h to [05F9]h, and thereafter the process operation is advanced to a further step SA5. At this step SA5, the CPU 15 reads a display clear command stored at an address of the target program storage unit 11a, which corresponds to the count value [05F9]h of the PC 15a, to interpret this display clear command. Then, the CPU 15 executes the display clear process in such a manner that the content displayed on the display unit is cleared, or deleted.

Next, when the PC 15a counts up the count value thereof from [05F9]h to [05FA]h, the process operation is advanced to a step SA6. At this step SA6, the CP 15 reads a new display command stored at an address of the target program storage unit 11a, which corresponds to the count value [05FA]h, to interpret this new display command. Then, the CPU 15 executes a new display process operation in such a way that, for example, such data which is inputted to be stored into a preselected register for constituting the target register unit 14 is newly displayed on the display unit (not shown).

Thereafter, the CPU 15 sequentially executes the target program in a similar manner to the above-explained manner. For the sake of simple explanations, although no detailed operation is specifically described, the CPU 15 supplies the historical information to the trace means 16 every time each of the above-explained commands is carried out. This historical information represents the count value of the PC 15a, and the sort of commands executed by the CPU 15.

TRACE PROCESSING/TRACE PACKET READING OPERATIONS IN FIRST PROGRAM CHECKING APPARATUS

In conjunction with the above-explained execution of the target program by the CPU 15, the trace means 16 performs the below-mentioned trace processing operation/trace packet reading operation. A first description will be made of the trace packet reading operation.

It should be noted that this trace packet reading process operation is, in principle, carried out independent from the below-explained trace processing operation.

First, the trace means 16 checks as to whether or not the trace packet TP is stored in the trace buffer 15. When this trace packet TP is not stored in the trace buffer 15, the trace means 16 is brought into a waiting state until the trace packet TP is stored thereinto. On the other hand, when the trace packet TP is stored into this trace buffer 15, the trace means 16 subdivides the trace packet TP stored in the trace buffer 15 into 4-bit blocks and outputs these 4-bit blocks. Then, the trace means 16 causes these 4-bit blocks to be stored into a predetermined storage area of the external storage apparatus 13. Then the process operation is returned to another process operation for again judging as to whether or not the trace packet TP is stored into the trace buffer 15. Such a process operation is repeatedly carried out.

Subsequently, a description is made of the trace processing operation. First, as represented in FIG. 5(1), the trace means 16 performs initializing operation, for example, clears the storage content of the trace buffer 17, and also sets a pointer to a head address "0" of the trace buffer 17 (namely, a position "PP$_0$" shown in FIG. 1). Thereafter, this trace processing operation is advanced to a step SB1 shown in FIG. 4, at which the trace means 16 checks as to whether or not the count value of the PC 15a and the historical information are supplied from the CPU 15. When this judgement result becomes "NO", the above-explained judgement is repeatedly carried out. On the other hand, when the judgement result of the step SB1 becomes "YES", namely, in such a case that the count value of the PC 15a and the historical information are supplied from the CPU 15, the trace processing operation is advanced to a step SB2. At this step SB2, the trace means 16 produces any one of 7 sorts of trace packets TPs made of either 8 bits or 40 bits. Subsequently, the trace processing operation is advanced to a step SB3. In this case, since the count value [0000]h of the PC 15a is supplied, the trace means 16 recognizes that the trace operation is commenced, and produces the trace packet TP of the trace code TRCODE[0101]b indicative of "commencement of trace" (see FIG. 2(1)), namely trace packet TP[05]h.

At the step SB3, a trace packet length "LTP" of the produced trace packet TP is calculated. Then, the trace process operation is advanced to a step SB4. In this case, since the trace packet TP[05]h is produced, this trace packet length LTP is 8 bits. At the step SB4, the trace means 16 judges as to whether or not the trace packet TP produced at the process operation at the step SB2 can be written into the trace buffer 17 based upon the following formula (1):

$$(MAD-PP) \geq LTP \tag{1}$$

In the above-described formula (1), symbol "MAD" shows a maximum value of an address of the trace buffer 17, and symbol "PP" indicates a present position (address value) of a pointer. When the judgment result of the step SB4 becomes "YES", the trace process operation is advanced to a step SB5. In this stage, since no data is stored in the trace buffer 17, the pointer is located at a head address (at $PP_0$ in FIG. 5(1)) and the above-described formula (1) can be satisfied, so that the trace process operation is advanced to a step SB5. At this step SB5, the trace packet TP is written into such a storage area indicated by the pointer of the trace buffer 17, and thereafter, the trace process operation is advanced to a step SB6. At this stage, as indicated in FIG. 5(2), the trace packet TP[05]h representative of the trace commencement is written from the head address of the trace buffer 17. At this step SB6, the position of the pointer is updated, the trace process operation is returned to the previous step SB1. In this stage, the pointer is moved from the position of $PP_0$ of FIG. 5(1) to another position of $PP_1$ of FIG. 5(2).

As previously explained, while the count value of the PC 15a and the historical information are not supplied from the CPU 15, wince the judgment result obtained at the step SB1 is left as "NO", the trace packet TP stored in the trace buffer 17 is subdivided into the 4-bit blocks and then these 4-bit trace packet blocks are outputted, and further, the process operations stored in a preselected storage area of the external storage apparatus 13 is repeatedly (see FIG. 5(3)). Then, when the count value of the PC 15a and the historical information are supplied from the CPU 15, the judgment result obtained at the step SB1 becomes "YES". The trace processing operation is advanced to the step SB2, and then the process operations defined at the steps SB2 to SB6 are repeatedly carried out. For example, in the process operation defined at the step SA2 of FIG. 3, the following input process operations are performed in such a way that the count value [0002]h of the PC 15a is inputted and the data having the value [0AC3]h is entered. As a result, the trace means 16 produces the trace packet TP[00000AC3X9]h (symbol "X" being an arbitrary value) having the format shown in FIG. 2(7) at the step SB2, and calculates the trace packet length (in this case, 40 bits) at the step SB3. Next, in accordance with the formula (1), since the trace packet TP can be still written, the judgment result obtained at the step SB4. Then, the trace process operation is advanced to the step SB5. At this step SB5, after this tracepacket [00000AC3X9]h is written into the storage area (namely, position of $PP_1$ of FIG. 5(2)) indicated by the pointer of the trace buffer 17, the position of this pointer is updated from $PP_1$ shown in FIG. 5(2) to $PP_2$ shown in 5(3) at the step SB6.

When the above-explained process operations are repeatedly performed, the trace packet TP is written into the trace buffer 17, and the trace packets TPs which have been subdivided into 4-bit blocks are sequentially read so as to be sequentially stored into the external storage apparatus 13.

However, the above-described formula (1) cannot be satisfied by the following reason. That is, the storage capacity of the trace buffer 17 is 320 bits and the total bit number of the trace packet TP which is written during one process operation is equal to 8 bits, or 40 bits, whereas the total bit number of the trace data which is read during one process operation is equal to 4 bits. As a consequence, after the trace packet TP [05[h indicative of the commencement of the trace having the 8-bit bit length has been written into the trace buffer 17, when such a trace packet TP having a 40-bit bit length is continuously produced 8 times, in such a case that the 8th trace packet TP having the 40-bit bit length is written into this trace buffer 17, the pointer is located at the position of $PP_8$ indicated in FIG. 5(4) (namely, 32 bit position defined from address MAD). As a consequence, the judgment result obtained at the step SB4 becomes "NO", and the trace process operation is advanced to a step SB7.

At this step SB7, a check is made as to whether or not the overflow packet OFP is writable into the trace buffer 15 based upon the above-described formula (1). When this judgment result becomes "YES", the trace process operation is advanced to a further step SB8. On the other hand, when the judgment result obtained at the step SB7 becomes "NO", this check of the step SB7 is repeatedly performed. Then, in the case that since the trace packet reading process operation is carried out independent from this trace process operation, the formula (1) can be satisfied, the judgment result obtained at the step SB7 becomes "YES". At the step SB8, an 8-bit (bit length) overflow packet OFP[03]h having such a format shown in FIG. 2(1) is produced, and then this produced overflow packet is written into the storage area of the trace buffer 15 as indicated by the above-described pointer (namely, position of $PP_8$ indicated in FIG. 5(4)). Thereafter, the trace process operation is advanced to a step SB9. At this step SB9, the position of the pointer is updated. Then, the trace process operation is advanced to a further step SB10. In this case, the pointer is transported to a position of $PP_9$ shown in FIG. 5(5).

At the step SB10, the trace packet TP stored in the trace buffer 17 is subdivided into 4-bit blocks, and these 4-bit trace buffer blocks are outputted to be stored into a preselected storage area of the external storage apparatus 13. Then, the trace process operation is advanced to a step SB11. At this step SB11, a check is made as to whether or not all of the trace packets $TP_s$ stored in the trace buffer 17 are read therefrom, and thus the storage content of this trace buffer 17 becomes completely empty. When this judgment result becomes "NO", the trace process operation is returned to the previous step SB10. In this case, since only one set of the 4-bit data is readout from the trace buffer 17, the judgment result obtained at the step SB10 becomes "NO". Then, the trace process operation is returned to the step SB9. Thus, the process operations defined at the step SB10 and SB11 are repeatedly performed. The, when the storage content of the trace buffer 17 becomes completely empty, the judgment result obtained at the step SBll becomes "YES", and the trace process operation is advanced to a further step SB12. At this step SB12, the position of the pointer is updated, and thereafter the trace process operation is returned to the step SB1. In this case, the pointer is moved to the position of $PP_0$ shown in FIG. 5(1). As a consequence, the trace means 16 can restart the trace process operation.

As previously described in accordance with the first program checking apparatus with employment of the above-explained arrangement of the above-explained arrangement, in the trace buffer 17, the trace packet TP is written and the 4-bit subdivided trace packets (trace packet blocks) TPs are sequentially read therefrom in accordance with the trace process operation. Then, the read 4-bit subdivided trace packets are stored into the external storage apparatus 13. As a consequence, the time duration during which the storage content of this trace buffer 17 is brought into the overflow condition can be prolonged. Also, even when the trace buffer 17 is brought into the overflow state, contrary to the conventional program checking apparatus, the operation of the CPU 15 is not stopped, but the access historical data under the real use condition and the content of the register can be traced. Furthermore, in such a case that the trace buffer 17 is brought into the overflow condition and therefore the trace packet TP cannot be continuously saved, such an overflow packet OFP indicative of this case is produced and then is written into the trace buffer 17. As a consequence, the execution conditions of the target program can be correctly grasped from the trace packet TP stored in the external storage apparatus 13. Furthermore, it is possible to judge as to where the trace operation is interrupted.

As a result, when there is such a bug problem in a target program, it is also possible to confirm, precisely speaking, the concrete position where the program bug occurs. Therefore, the checking operation of the target program can be simply and quickly carried out.

Also, when the trace buffer 17 is brought into the overflow state, since the next historical information is acquired after all of the trace packets TPs stored in the trace buffer 17 have been stored into the external storage apparatus 13, the production frequency of the overflow packet OFP can be minimized.

OVERALL ARRANGEMENT OF SECOND PROGRAM CHECKING APPARATUS

Figure 6:
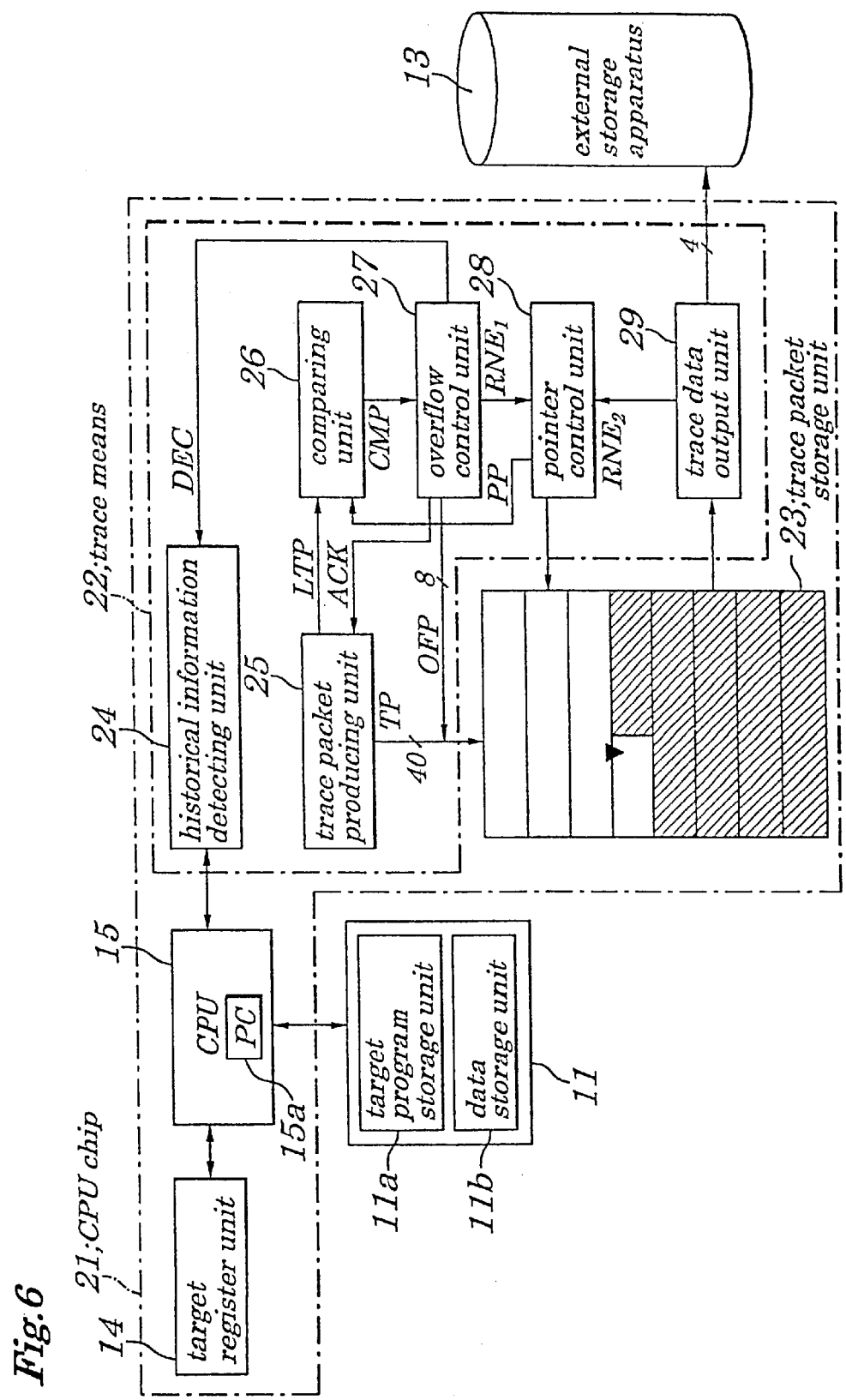
FIG. 6 is a schematic block diagram for representing an electronic arrangement of a program checking apparatus according to a second embodiment of the present invention.

Referring to FIG. 6, a program checking apparatus according to a second embodiment of the present invention will be described. It should be noted that the same reference numerals shown in FIG. 1 will be employed as those for indicating the same, or similar structural elements represented in FIG. 6. This second program checking apparatus shown in FIG. 6 is featured by newly employing a CPU (central processing unit) chip 21, instead of the above-explained CPU chip 12 of the first program checking apparatus.

The CPU chip 21 is mainly arranged by a target register unit 14, a CPU 15, a trace means 22, and a trace packet storage unit 23.

The trace means 22 is mainly arranged by a historical information detecting unit 24, a trace packet producing unit 25, a comparing unit 26, an overflow control unit 27, a pointer control unit 28, and a trace data output unit 29.

The historical information detecting unit 24 detects a count value of the PC 15a and historical information supplied from the CPU 15 in response to a detection instruction signal DEC supplied from the overflow control unit 27, and then supplies these detected data to the trace packet producing unit 25. Based upon the count value of the PC 15a and the historical information supplied from the historical information detecting unit 24, the trace packet producing unit 25 produces any one of 7 sorts of parallel trace packets TPs constituted by either 8 bits or 40 bits, as previously explained in the first embodiment. This trace packet producing unit 25 writes the trace packet TP into a storage area of the trace packet storage unit 23 pointed by a pointer in response to an allow signal "ACK" supplied from the overflow control unit 27. Also, this trace packet producing unit 25 calculates a trace packet length LTP of the produced trace packet TP and then supplies this calculated trace packet length LTP to the comparing unit 26. The comparing unit 26 is provided so as to calculate a difference between the trace packet length LTP supplied from the trace packet producing unit 25 and a present position "PP" of the pointer supplied from the pointer control unit 28. Then, the comparing unit 26 sullies this difference value as a comparison signal CMP to the overflow control unit 27.

In response to the comparison signal CMP supplied from the comparing unit 26, the overflow control unit 27 supplies the allow signal ACK to the trace packet producing unit 25, or produces an overflow packet "OFP" in a parallel form to be written into the above-described storage area indicated by the pointer, and also supplies a pointer update request signal $RNE_1$ to the pointer control unit 28. This allow signal ACK is used to allow the trace packet TP to be written into the storage area indicated by the pointer of the trace packet storage 23. Also, this pointer request signal $RNE_1$ is used to request updating of the pointer.

Also, the overflow control unit 27 supplies the detection instruction signal DEC to the historical information detecting unit 24 so as to detect the historical information and the like. In response to a pointer update request signal $RNE_1$ supplied from the overflow control unit 27 and another pointer update request signal $RNE_2$ supplied from the trace data output unit 29, the pointer control unit 28 updates the present position PP of the pointer in the trace packet storage unit 23, and further notifies the present position PP of the pointer to the comparing unit 26. The trace data output unit 29 converts the 1-bit serial trace packet TP and the overflow packet OFP into 4-bit parallel trace data, and writes this 4-bit parallel trace data into a predetermined storage area of the external storage apparatus 13, and also supplies the pointer update request signal $RNE_2$ to the pointer control unit 28. This 1-bit serial trace packet TP is outputted from the trace packet storage unit 23.

INTERNAL ARRANGEMENT OF TRACE PACKET STORAGE UNIT 23

Figure 7:
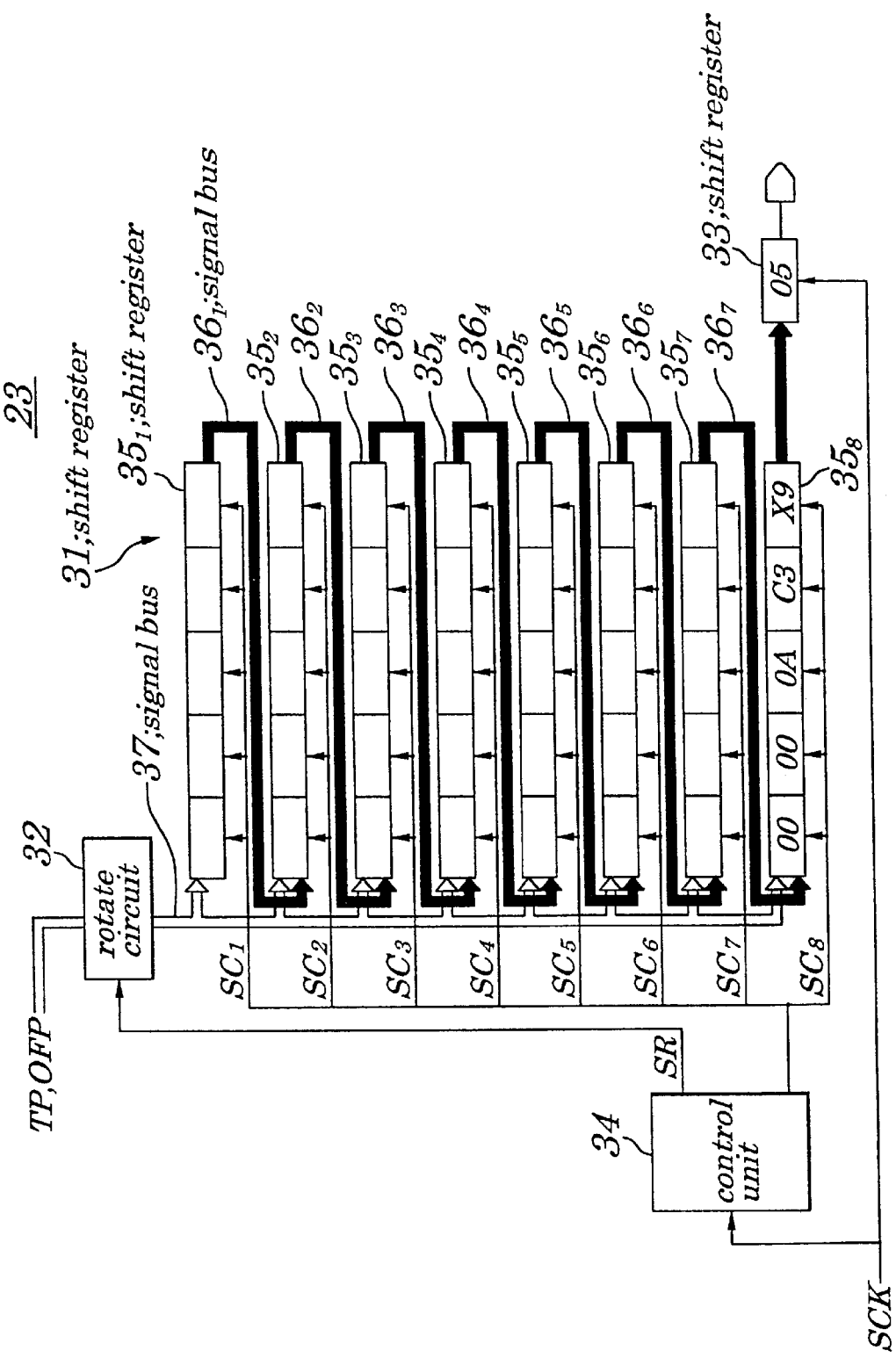
FIG. 7 is a schematic block diagram for showing an arrangement of a trace packet storage unit employed in the program checking apparatus of the second embodiment.

As represented in FIG. 7, the trace packet storage unit 23 is mainly arranged by a shift register 31, a rotate circuit 32, a shift register 33, and a control unit 34. The shift register 31 is arranged in such a manner that 8 sets of shift registers $35_1$ to $35_8$ are series-connected with each other via signal buses $36_1$ to $36_7$. The shift register $35_1$ to $35_8$ is arranged by each employing 5 sets of flip-flops. Each flip-flop can hold 8-bit serial data, and a single shift register 35 can hold 40-bit serial data at maximum.

As a result, the entire shift register 31 may hold 320-bit data at maximum. In response to control signals $SC_1$ to $SC_8$ supplied from the control unit 34, each of the flip-flops which constitute each of the shift registers $35_1$ to $35_8$ executes a load operation for saving supplied data, a shift operation, and/or is brought into an enable condition under which this flip-flop is not operated. In this shift operation, data which are held in one flip-flop in synchronism with a shift clock SCK are shifted in unit of 8 bits to another flip-flop located adjacent to the above-described flip-flop on the side of the lower bit. It should be understood that in FIG. 7, a black triangle mark indicated at a flip-flop of a least significant bit (LSB) of the shift register $35_7$ implies a pointer.

Similarly, in the trace packet storage unit 23 shown in FIG. 6, a portion indicated by a hatching line indicates such a storage area where the trace packet TP is stored, and a black triangle mark implies the pointer.

The rotate circuit 32 executes a rotate process operation with respect to both the parallel trace packet TP and the overflow packet OFP, which are supplied, in response to a rotate control signal SR supplied from the control unit 34. Then, the rotate circuit 32 supplies the rotate-processed data via a signal bus 37 to any one of the registers $35_1$ to $35_8$. The shift register 33 can hold the 8-bit serial data, and shifts 1-bit data every 1 time to the lower bit side in response to the supplied shift clock SCK to output the bit-shifted data. Also, this shift register 33 supplies the bit-shifted data as a serial trace packet TP and an overflow packet OFP to the trace data output unit 29. The control unit 34 produces the rotate control signal SR and the control signals $SC_1$ to $SC_8$ in synchronism with the supplied shift clock SCK so as to control the various circuit elements of this trace packet storage unit 23.

It should be understood that detailed arrangement/ operation of the trace packet storage unit 23 are described in Japanese Patent Application No. 9-4546 filed by the Applicant.

PROGRAM CHECKING OPERATION BY SECOND PROGRAM CHECKING APPARATUS

Figure 8:
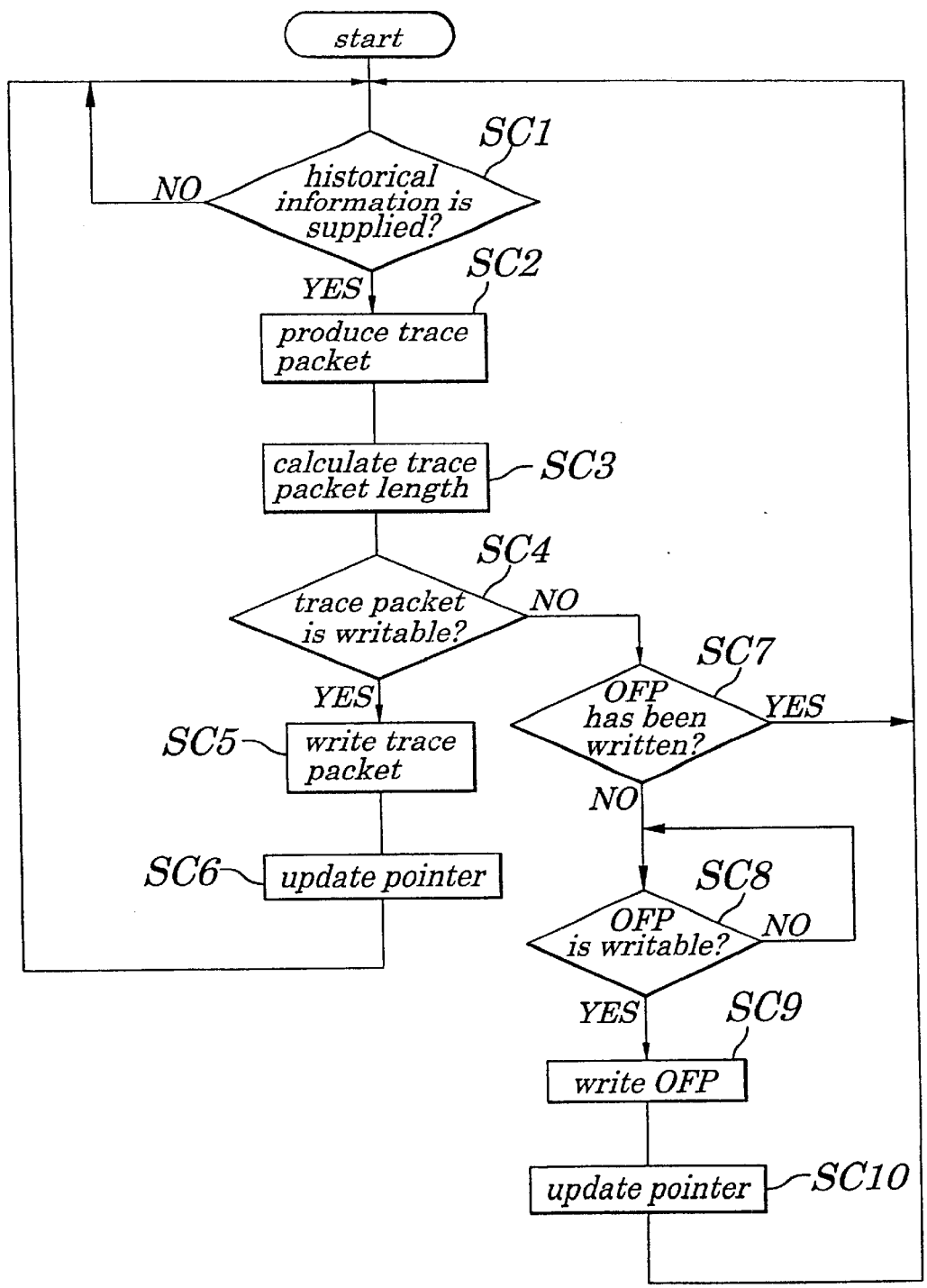
FIG. 8 is a flow chart for describing operations of trace means employed in the program checking apparatus of the second embodiment.

Next, a target program checking operation by this second program checking apparatus with employment of the above-described arrangement will be described with reference to a flow chart shown in FIG. 8. Also, in this second embodiment, a target program to be checked corresponds to the flowchart shown in FIG. 3. The operations executed by the CPU 15 are carried out in a similar manner to those of the above-described CPU 15 employed in the first embodiment. As a result, the operations of the CPU 15 employed in the second program checking apparatus are omitted.

A description will be subsequently made of trace process operation by the trace means 22, which is executed in a parallel manner to the execution of the target program by the CPU 15.

First, the pointer control unit 28 executes the below-mentioned initializing process operation. That is, all of storage contents of the shift registers 31 and 33 which constitute the trace packet storage unit 23 are cleared. Also, such an initialization signal is supplied to the control unit 34 which constitutes the trace packet storage unit 23. This initialization signal is used to set the pointer to a flip-flop (address MAD) located at the LSB 8 bit, which constitutes an 8th shift register $35_8$ of the shift register 31 for constituting the trace packet storage unit 23. As a result, the control unit 34 clears all of the storage contents of the shift registers 31 and 33, and also sets the pointer.

Next, in response to the detection instruction DEC supplied from the overflow control unit 27, the historical information detecting unit 24 judges as to whether or not the count value of the PC 15a and the historical information are supplied from the CPU 15 (step SC1). When this judgment result becomes "NO", the historical information detecting unit 24 repeatedly performs this judgment.

Also, the trace data output unit 29 converts the 1-bit serial trace packet TP and the overflow packet OFP into 4-bit parallel trace data, and writes this 4-bit parallel trace data into a predetermined storage area of the external storage apparatus 13, and thereafter supplies the pointer update request signal $RNE_2$ to the pointer control unit 28. This 1-bit serial trace packet TP is outputted from the trace packet storage unit 23.

As a consequence, the pointer control unit 28 updates the present position PP of the pointer in the trace packet storage unit 23 in response to the pointer update request signal $RNE_2$, and also notifies the present point PP of the pointer to the comparing unit 26. In this case, since no data is stored in the trace packet storage unit 23, neither data is stored into the external storage apparatus 13, nor the present position PP of the pointer is updated.

To the contrary, in the case at the judgment result of the step SC1 becomes "YES", namely the count value of the PC 15a and the historical information are supplied from the CPU 15 to the historical information detecting unit 24, the historical information detecting unit 24 supplies the detected count value of the PC 15a and the detected historical information to the trace packet producing unit 25. As a result, the trace packet producing unit 25 produces any one of 7 sorts of parallel trace packets TPs made of either 8 bits or 40 bits at a step SC2. In this case, since the count value [0000]h of the PC 15a is supplied, the trace packet producing unit 25 recognizes that the trace operation is commenced, and produces the trace packet TP of the trace code TRCODE[0101]b indicative of "commencement of trace" (see FIG. 2(1)), namely trace packet TP[05]h. Next, the trace packet producing unit 25 calculates a trace packet length "LTP" of the produced trace packet TP, and then supplies the trace packet length LTP to the comparing unit 26 (step SC3). In this case, since the trace packet TP[05]h is produced, this trace packet length LTP is 8 bits. As a result, the comparing unit 26 calculates a difference between the trace packet length LTP and the present position PP of the pointer, and then supplies a comparison signal CMP indicative of this difference to the overflow control unit 27. In this case, since no data is stored in the shift register 31 of the trace packet storage unit 23, the pointer is located at the position of the LSB 8 bit for constituting the 8th shift register $35_8$ of the shift register 31 which constitutes the trace packet storage unit 23, and also the comparing unit 26 supplies such a comparison signal CMP indicative of (320−8=312) bits to the overflow control unit 27. Then, this overflow control unit 27 judges as to whether or not the trace packet TP can be written based upon the comparison signal CMP at a step SC4. When this judgment result becomes "YES", the overflow control unit 26 supplies the allow signal ACK to the trace packet producing unit 25, and also supplies the pointer update request signal $RNE_1$ to the pointer control unit 28, and furthermore supplies the detection instruction signal DEC to the historical information detecting unit 24. This allow signal ACK may allow the trace packet TP to be written into the storage area of the trace packet storage unit 23 pointed out by the pointer.

On the other hand, when the judgment result of the above-described step SC4 becomes "NO", namely in such a case that the trace packet TP cannot be written, no allow signal ACK is supplied to the trace packet producing unit 25, but also other process operations are not carried out. In this case, since the comparison signal CMP indicative of 312 bits is supplied, the overflow control unit 27 judges that the trace packet TP can be written, so that the allow signal ACK is supplied to the trace packet supply unit 25 and the pointer update request signal $RNE_1$ is supplied to the pointer control unit 28, and furthermore, the detection instruction signal DEC is supplied to the historical information detecting unit 24. As a consequence, the trace packet producing unit 25 writes the trace packet TP into the storage area of the trace packet storage unit 23 in response to the allow signal ACK supplied from the overflow control unit 27 (step SC5). In this case, the trace packet TP [05]h indicative of the start of the trace process operation is written into the flip-flop of the LSM 8 bit, which constitutes the 8th shift register $35_8$ of the shift register 31 for arranging the trace packet storage unit 23. Also, the pointer control unit 28 updates the present position PP of the pointer in the trace packet storage unit 23 in response to the pointer update request signal $RNE_1$ supplied from the overflow control unit 27, and also notifies the present position PP of the pointer to the comparing unit 26 (step SC6). In this case, the present position PP of the pointer is moved to a position of a flip-flop at a lower-digit 16 bit, which constitutes the 8th shift register $35_8$. Then, the historical information detecting unit 24 judges as to whether or not the count value of the PC 15a and the historical information are again supplied from the CPU 15 based on the detection instruction signal DEC supplied from the overflow control unit 27 at a step SC1.

While the above-described process operations defined at the steps SC1 to SC6, in the trace packet storage unit 23, the data are shifted in the respective shift registers $35_1$ tp $35_8$ which constitute the shift register 31 in synchronism with the shift clock SCK, and the trace data are sequentially stored into the external storage apparatus 13 via the trace data output unit 29 under control of the control unit 34.

When the above-explained process operations are repeatedly performed, the trace packet TP is written into the trace packet storage unit 23, and the serial trace packet TP is outputted in the unit of 1 bit. Then, these serial trace packet TP are converted into the 4-bit parallel trace data which will be then written into a preselected storage area of the external storage apparatus 13.

However, the storage capacity of the trace packet storage unit 23 is 320 bits and the total bit number of the trace packet TE which is written during one process operation is equal to 8 bits, or 40 bits, whereas the total bit number of the trace data which is read during one process operation is equal to 4 bits. As a consequence, after the trace packet TP [05]h indicative of the commencement of the trace having the 8-bit bit length has been written into the trace buffer 17, when such a trace packet TP having a 40-bit bit length is continuously produced 8 times, in such a case that the 8th trace packet TP having the 40-bit bit length is written into this trace buffer 17, the present position PP of the pointer would be decreased, as compared with the bit length LTP of the trace packet TP.

Accordingly, the comparing unit 26 supplies the comparison signal CMP indicative of a bit number (minus number) of a difference between the present position PP of the pointer and the bit length LTP of the trace packet TP. As a result, in response to this comparison signal CMP, the overflow control unit 27 judges that the trace packet TP cannot be written and therefore, does not supply the allow signal ACK to the trace packet producing unit 25 (step SC4). Next, the overflow control unit 27 judges as to whether or not the overflow packet OFP has been written (step SC7). This judgment may be realized as follows. For instance, while a flag is set into the overflow control unit 27 and this flag is set to 1 when the overflow packet OFP has been written, the overflow control unit 27 judges as to whether or not this flag is set to 1. When the judgment result of the step SC7 is "YES", namely when the overflow packet OFP has been written, the overflow control unit 27 supplies the detection instruction signal DEC to the historical information detecting unit 24. As a result, the historical information detecting unit 24 judges as to whether or not the count value of the PC 15a and the historical information are again supplied from the CPU 15 based on the detection instruction signal DEC supplied from the overflow control unit 27 (step SC1).

To the contrary, in the case that the judgment result of the step SC7 is "NO", namely when the overflow packet OFP has not yet been written, the overflow control unit 27 judges as to whether or not the overflow packet OFP can be written (step SC8). This judgment maybe realized by checking, for example, as to whether or not (maximum value MAD of address—present position PP of pointer) is larger than, or equal to 8. When the judgment result of the step SC8 is "YES", the process operation by the overflow control unit 27 is advanced to a further step SC9. On the other hand, when the judgment result of the step SC8 is "NO", this overflow control unit 27 repeatedly performs the same judgment. Then, since the data shift operation is carried out in the respective shift registers $35_1$ to $35_8$ of the trace packet storage unit 23 and the trace data is written into the external storage apparatus in the trace data output unit 29, when the present position PP of the pointer becomes larger than, or equal to 8, the judgment result of the step SC8 becomes "YES". At a step SC9, the overflow control unit 27 produces the overflow packet OFP and then writes this overflow packet OFP into a storage area indicated by the pointer. Next, the overflow control unit 27 supplies the pointer update request signal $RNE_1$ to the pointer control unit 28, and further supplies the detection instruction signal DEC for instructing the detection of the historical information to the historical information detecting unit 24 (step SC10). As a result, the historical information detecting unit 24 judges as to whether or not the count value of the PC 15a and the historical information are supplied from the CPU 15 based on the detection instruction signal DEC supplied from the overflow control unit 27 (step SC1).

As previously described in detail, in accordance with the second program checking apparatus, the following feature can be realized. That is, for instance, in the first program checking apparatus, when the process operation defined at the step SA2 of the target program shown in FIG. 2 is executed, if the shift register 31 for constituting the trace packet storage unit 23 is brought into the overflow condition, then the subsequent historical information is not acquired until the storage contents of the trace buffer 17 become completely empty. As a result, there is a risk. That is, the trace means 16 may not trace the branch destination of the trace process operation at the step SA3. However, in accordance with this second program checking apparatus, when the storage area into which the trace packet TP can be written can be secured in the trace packet storage unit 23, the next historical information is acquired to be once converted into the trace packet TP. Thereafter, this trace packet can be written into the trace packet storage unit 23. When a portion of the historical information related to the process operations defined at the steps SA5 to SA6 can be acquired, it is possible to judge the branch destination. As a consequence, the time duration required to interrupt the trace process operation by the second program checking apparatus can be shortened, as compared with that of the first program checking apparatus. Accordingly, the time interval of the acquirable historical information can be shortened. Furthermore, in accordance with the second program processing apparatus, since the packet storage unit 23 is employed, it is possible to avoid the occurrence of such a useless register portion of the shift register 31. Therefore, the use efficiency of the shift register 31 can be improved, and thus, the interrupt time duration of this trace process operation can be reduced.

OVERALL ARRANGEMENT OF THIRD PROGRAM CHECKING APPARATUS

Figure 9:
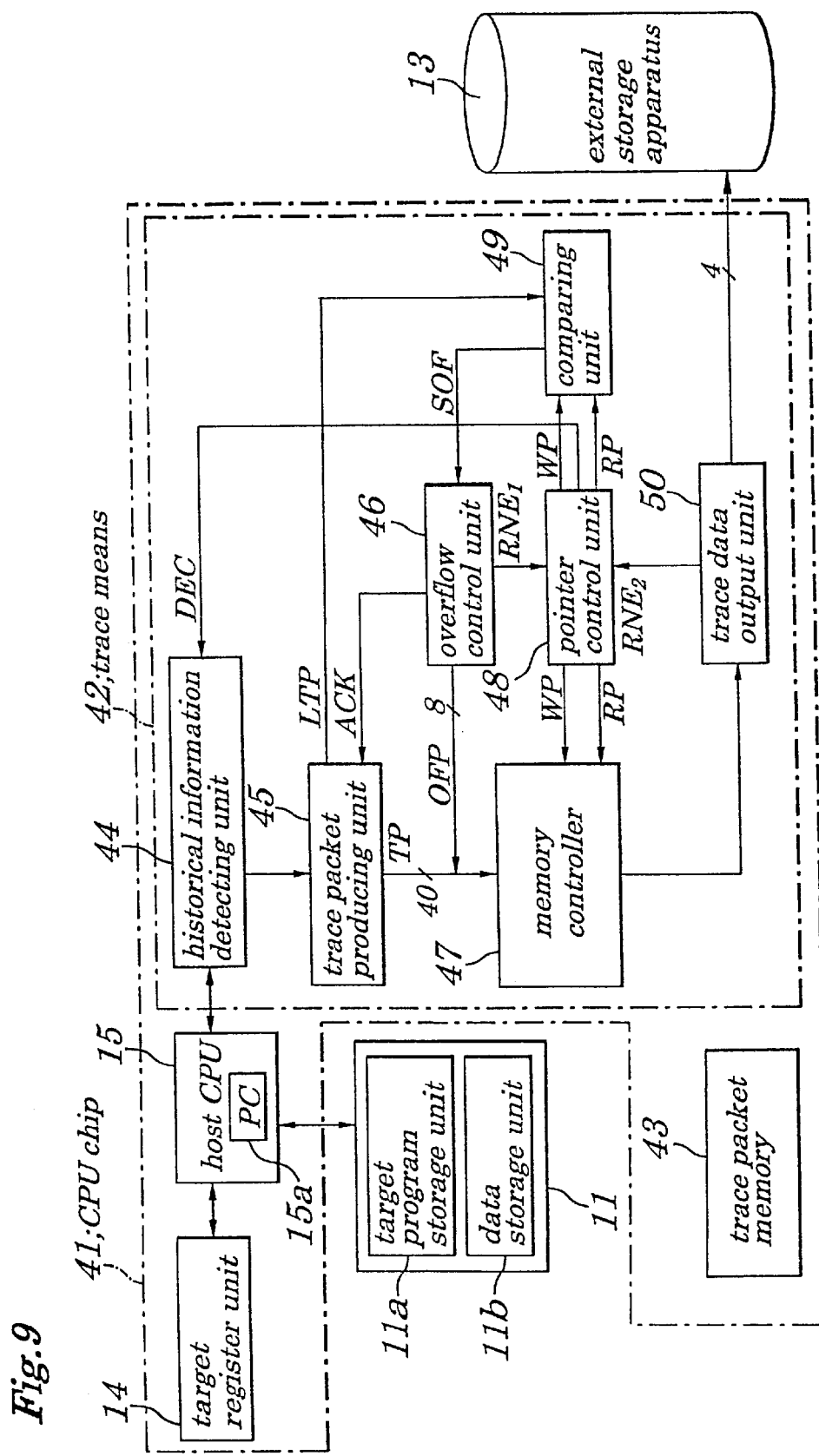
FIG. 9 is a schematic block diagram for representing an electronic arrangement of a program checking apparatus according to a third embodiment of the present invention.

Referring to FIG. 9, a program checking apparatus according to a third embodiment of the present invention will be described. It should be noted that the same reference numerals shown in FIG. 6 will be employed as those for indicating the same, or similar structural elements represented in FIG. 9. This third program checking apparatus shown in FIG. 9 is featured by newly employing a CPU (central processing unit) chip 41, instead of the above-explained CPU chip 21 of the second program checking apparatus.

The CPU chip 41 is mainly arranged by a trace means 42, and a trace packet memory 43.

The trace means 42 is mainly arranged by a historical information detecting unit 44, a trace packet producing unit 45, a comparing unit 49, an overflow control unit 46, a memory controller 47, a pointer control unit 48, and a trace data output unit 50.

The historical information detecting unit 44 detects a count value of the PC 15a and historical information supplied from the CPU 15 in response to a detection instruction signal DEC supplied from the overflow control unit 46, and then supplies these detected data to the trace packet producing unit 45. Based upon the count value of the PC 15a and the historical information supplied from the historical information detecting unit 44, the trace packet producing unit 45 produces any one of 7 sorts of parallel trace packets TPs constituted by either 8 bits or 40 bits, as previously explained in the first embodiment. This trace packet producing unit 45 supplies the produced trace packet TP in response to an allow signal "ACK" supplied from the overflow control unit 46. Also, this trace packet producing unit 45 calculates a trace packet length LTP of the produced trace packet TP and then supplies this calculated trace packet length LTP to the comparing unit 49.

In response to an overflow signal SOF supplied from the comparing unit 49, the overflow control unit 46 supplies an allow signal ACK to the trace packet producing unit 45, or produces an overflow packet "OFP" to supply this overflow packet OFP to the memory controller 47. The overflow control unit 46 supplies a pointer update request signal $RNE_1$ to the pointer control unit 48, and this pointer update request signal $RNE_1$ is used to request updating of a pointer.

The memory controller 47 writes either the trace packet TP or the overflow packet OFP into a storage area of the trace packet memory 43. This trace packet TP is supplied from the trace packet producing unit 45, and this overflow packet OFP is supplied from the overflow control unit 46. This storage area of the trace packet memory 43 is designated by a write pointer WP supplied from the pointer control unit 47. Also, the memory controller 47 reads a trace packet TP and an overflow packet OFP from a storage area of the trace packet memory 43, which is designated by a read pointer RP supplied from the pointer control unit 48, and then supplies these read trace packet TP and overflow packet OFP to the trace data output unit 50.

In response to a pointer update request signal $RNE_1$ supplied from the overflow control unit 46 and another pointer update request signal $RNE_2$ supplied from the trace data output unit 50, the pointer control unit 48 updates a write pointer WP and a read pointer RP used in the trace packet memory 43, and also notifies these write pointer WP and read pointer RP to the comparing unit 49. Also, the pointer control unit 48 supplies a detection instruction signal DEC for instructing that the historical information detecting unit 44 detects the historical information. The comparing unit 49 judges as to whether or not an overflow state happens to occur in the trace packet memory 43 in response to the trace packet length LTP supplied from the trace packet producing unit 45 and both the write pointer WP and the read pointer RP supplied from the pointer control unit 48. When the overflow state occurs, this comparing unit 49 produces the overflow signal SOF to supply this overflow signal SOF to the overflow control unit 46. The trace data output unit 50 converts the trace packet TP supplied from the memory controller 47 into 4-bit parallel trace data, and writes this 4-bit parallel trace data into a predetermined storage area of the external storage apparatus 13, and also supplies the pointer update request signal $RNE_2$ to the pointer control unit 48.

The trace packet memory 43 is arranged by a RAM and the like, and owns a storage capacity of 320 bits. Under control of the memory controller 47, either the trace packet TP or the overflow packet OFP is written into this trace packet memory 43, and further, both the trace packet TP and the overflow packet OFP are read from this trace packet memory 43. It is now assumed that the memory controller 47 sequentially writes either the trace packet TP or the overflow packet OFP from an address "0" of the trace packet memory 43 toward a maximum address "MAD" thereof. After the trace packet TP or the overflow packet OFP has been written up to the maximum address "MAD", this memory controller 47 sequentially reads both the trace packet TP and the overflow packet OFP from the address "0" of this trace packet memory 43 toward the maximum address MAD thereof. Then, the memory controller 47 again sequentially writes either the trace packet TP or the overflow packet OFP from the address "0" toward the maximum address MAD.

PROGRAM CHECKING OPERATION BY THIRD PROGRAM CHECKING APPARATUS

Figure 10:
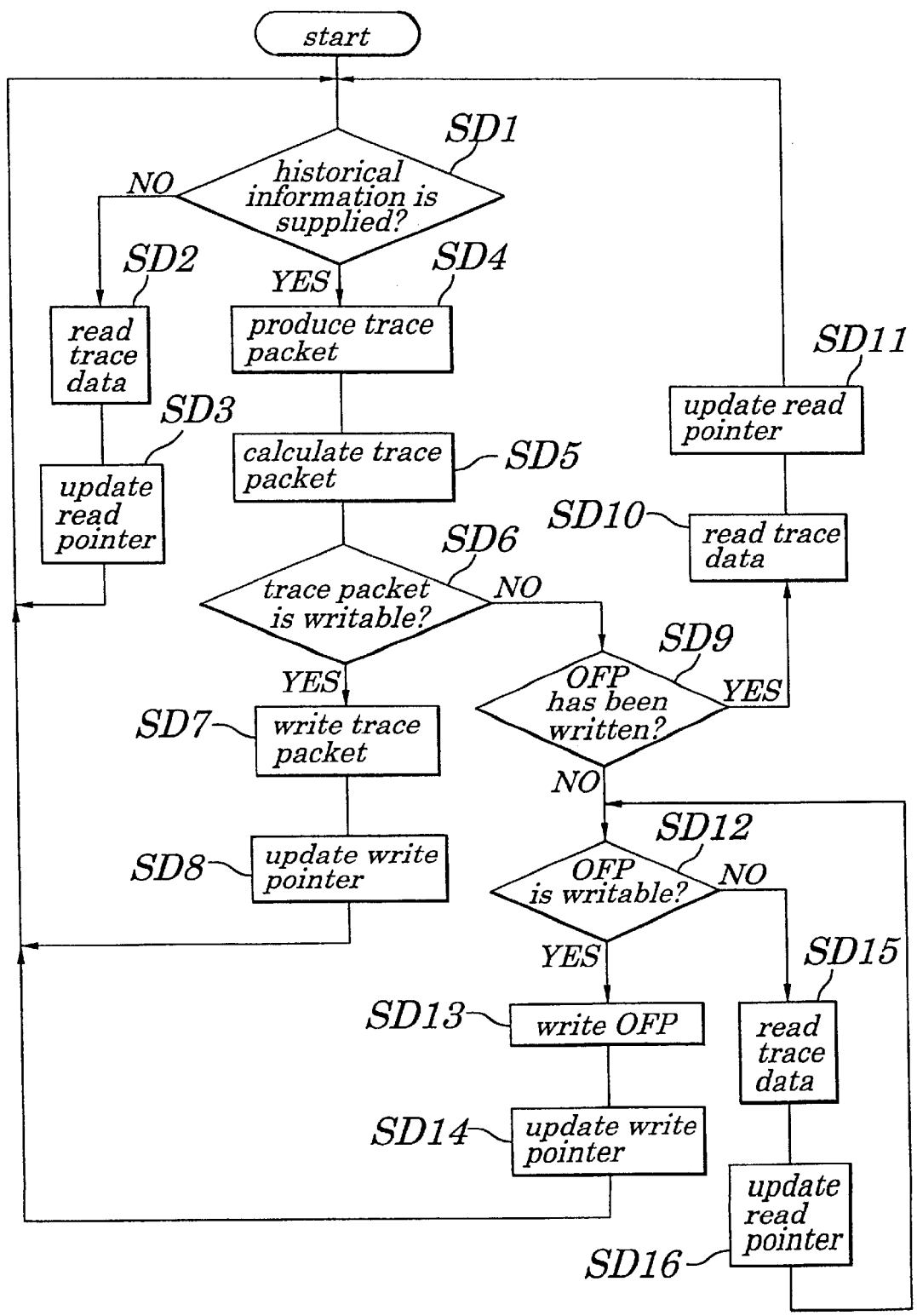
FIG. 10 is a flow chart for describing operations of trace means employed in the program checking apparatus of the third embodiment.
Figure 11:
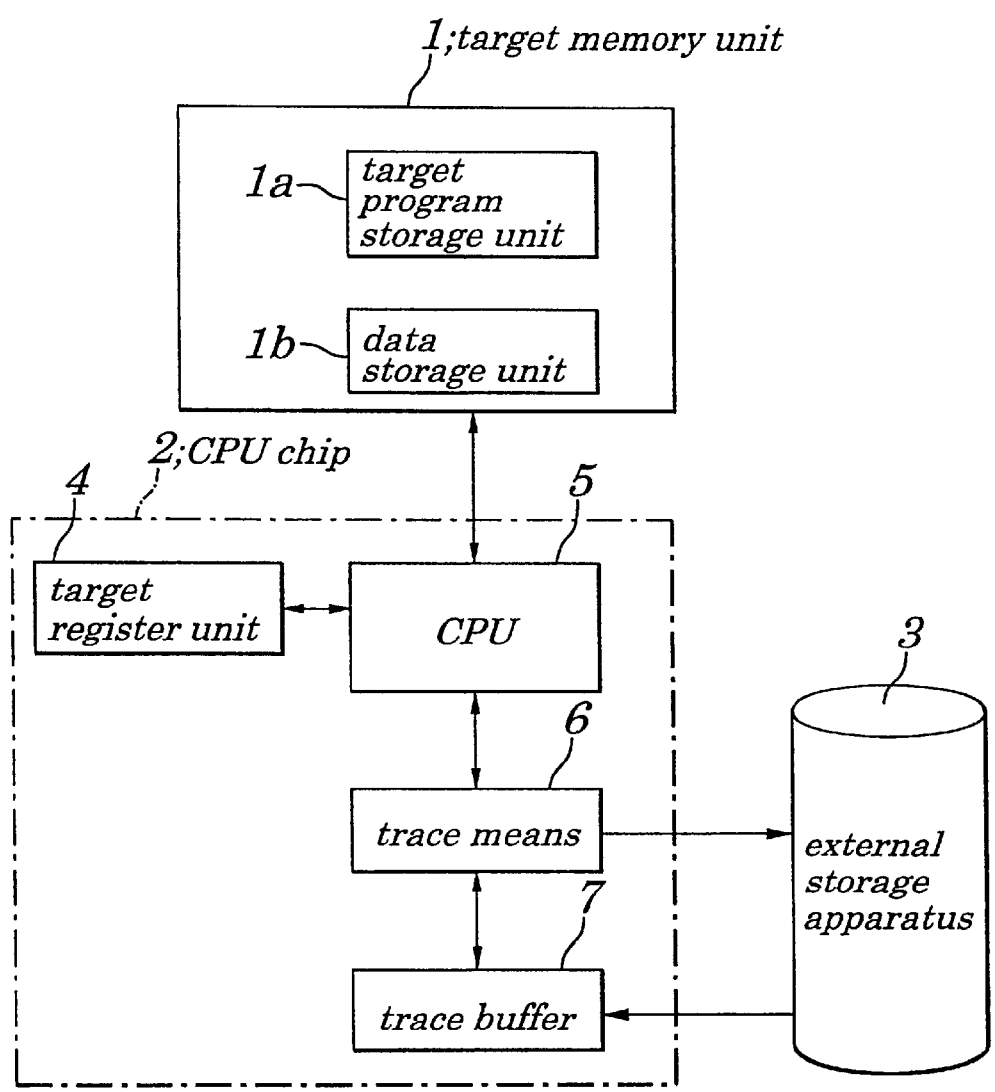
FIG. 11 is a schematic block diagram for representing the electronic arrangement of the conventional program checking apparatus.

Next, a target program checking operation by this third program checking apparatus with employment of the above-described arrangement will be described with reference to a flow chart shown in FIG. 10. Also, in this third embodiment, a target program to be checked corresponds to the flowchart shown in FIG. 3. The operations executed by the CPU 15 are carried out in a similar manner to those of the above-described CPU 15 employed in the first embodiment. As a result, the operations of the CPU 15 employed in the second program checking apparatus are omitted.

A description will be subsequently made of trace process operation by the trace means 42, which is executed in a parallel manner to the execution of the target program by the CPU 15.

First, the pointer control unit 48 executes the below-mentioned initializing process operation. That is, all of storage contents of the trace packet memory 43 are cleared. Also, such an initialization signal is supplied to the memory controller 47. This initialization signal is used to set both the write pointer WP and the read pointer RP to a head address of the trace packet memory 43. As a result, the memory controller 47 cleans all of the storage contents of the trace packet memory 43, and sets both the write pointer WP and the read pointer RP.

Next, in response to the detection instruction DEC supplied from the overflow control unit 46, the historical information detecting unit 44 judges as to whether or not the count value of the PC 15a and the historical information are supplied from the CPU 15 (step SD1). When this judgment result becomes "NO", namely when the count value of the PC 15a and the historical information are not supplied from the CPU 15, the historical information detecting unit 44 notifies this judgment result to the memory controller 47. As a result, the memory controller 47 reads out the trace packet TP from the storage area of the trace packet memory, which is designated by the read pointer RP supplied from the pointer control unit 44. Then, the memory controller 47 supplies the read trace packet TP to the trace data output unit 50 (step SD2). As a result, the trace data output unit 50 converts the trace packet TP supplied from the memory controller 50 into 4-bit parallel trace data, and writes this 4-bit parallel trace data into a predetermined storage area of the external storage apparatus 13, and thereafter supplies the pointer update request signal $RNE_2$ to the pointer control unit 48.

As a consequence, the pointer control unit 48 updates the read pointer RP in the trace packet memory 43 in response to the pointer update request signal $RNE_2$, and also notifies the updated read pointer RP to the comparing unit 49. Also, the pointer control unit 48 supplies the detection instruction signal DEC to the historical information detection unit 44 (step SD3). In this case, since no data is stored in the trace packet memory 43, neither data is stored into the external storage apparatus 13, nor the read pointer RP is updated. Then, the historical information detecting unit 44 again judges as to whether or not the count value of the PC 15a and the historical information are supplied from the CPU 15 in response to the detection instruction signal DEC supplied from the pointer control unit 48 (step SD1).

To the contrary, in the case at the judgment result of the step SD1 becomes "YES", namely the count value of the PC 15a arid the historical information are supplied from the CPU 15 to the historical information detecting unit 44, the historical information detecting unit 44 supplies the detected count value of the PC 15a and the detected historical information to the trace packet producing unit 45. As a result, the trace packet producing unit 45 produces any one of 7 sorts of parallel trace packets TPs made of either 8 bits or 40 bits at a step SD4. In this case, since the count value [0000]h of the PC 15a is supplied, the trace packet producing unit 45 recognizes that the trace operation is commenced, and produces the trace packet TP of the trace code TRCODE[0101]b indicative of "commencement of trace" (see FIG. 2(1)), namely trace packet TP[05]h.

Next, the trace packet producing unit 45 calculates a trace packet length "LTP" of the produced trace packet TP, and then supplies the trace packet length LTP to the comparing unit 49 (step SD5). In this case, since the trace packet TP[05]h is produced, this trace packet length LTP is 8 bits. As a result, the comparing unit 49 judges as to whether or not the trace packet TP can be written based upon the following formula (2) and formula (3), namely whether or not the overflow happens to occur:

$$(MAD-WP) \geq LTP \quad (2),$$

and $$RP \geq LTP \quad (3).$$

That is, to say, as previously explained, since the memory controller 47 writes either the trace packet TP or the overflow packet OFP into the trace packet memory 43 in the cyclic manner, when either the above formula (2) or the above formula (3) can be satisfied, the trace packet TP is still writable. To the contrary, in such a case that neither the formula (2), nor the formula (3) can be satisfied, this implies that the overflow occurs. As a result, the comparing unit 49 can judge as to whether or not the overflow happens to occur based on the above-described formulae (2) and (3). In this case, since no data is stored into the trace packet memory 43, the write pointer WP is located at the position of the head address "0" of the trace packet memory 43, so that the above-explained formula (2) can be satisfied. Therefore, the comparing unit 49 judges that the trace packet TP can be written, and thus, does not supply the overflow signal SOF to the overflow control unit 46. As a consequence, since the overflow signal SOF is not supplied, the overflow control unit 46 supplies an allow signal ACK to the trace packet producing unit 45, and also supplies the pointer update request signal $RNE_1$ to the pointer control unit 48. This allow signal ACK may allow the trace packet TP to be written into the storage area of the trace packet storage unit 23 pointed out by the write pointer of the trace packet memory 43. As a consequence, the trace packet producing unit 45 supplies the produced trace packet TP to the memory controller 47 in response to the allow signal ACK supplied from the overflow control unit 46.

The memory controller 47 writes the trace packet TP supplied from the trace packet producing unit 45 into the storage area of the trace packet memory 43, which is designated by the write pointer WP supplied from the pointer control unit 48 (step SD7). In this case, the trace packet TP [05]h indicative of the start of the trace process operation is written from the head address "0" of the trace packet memory 43. Also, the pointer control unit 48 updates the write pointer in the trace packet memory 43 in response to the pointer update request signal $RNE_1$ supplied from the overflow control unit 46, and also notifies the write pointer WP to the comparing unit 49 and the memory controller 47. Furthermore, the pointer control unit 48 supplies the detection instruction signal DEC to the historical information detecting unit 44 (step SD8). Then, the historical information detecting unit 44 judges as to whether or not the count value of the PC 15a and the historical information are again supplied from the CPU 15 based on the detection instruction signal DEC supplied from the overflow control unit 27 at a step SD1.

When the above-explained process operations are repeatedly performed, the trace packet TP is written into the trace packet memory 43, and the trace packet TP is read out. Then, this read trace packet TP is converted into the 4-bit parallel trace data which will be then written into a preselected storage area of the external storage apparatus 13. However, the storage capacity of the trace packet memory 43 is 320 bits and the total bit number of the trace packet TP which is written during one process operation is equal to 8 bits, or 40 bits, whereas the total bit number of the trace data which is read during one process operation is equal to 4 bits. As a consequence, there are some events that neither the above-explained formula (2), nor the above-described formula (3) can be satisfied. In this case, the comparing unit 49 judges that the overflow happens to occur, and therefore, supplies the overflow signal SOF to the overflow control unit 46. As a result, since the overflow signal SOF is supplied, the overflow control unit 46 judges that the trace packet TP cannot be written, and does not supply the allow signal ACK to the trace packet producing unit 45 (step SD6). Next, the overflow control unit 46 judges as to whether or not the overflow packet OFP has been written (step SD9). This judgment may be realized as follows. For instance, while a flag is set into the overflow control unit 46 and this flag is set to 1 when the overflow packet OFP has been written, the overflow control unit 46 judges as to whether or not this flag is set to 1. When the judgment result of the step SD9 is "YES", namely when the overflow packet OFP has been written, the overflow control unit 46 notifies this writing of the overflow to the memory controller 47.

As a result, the memory controller 47 reads out the trace packet TP from the storage area of the trace packet memory, which is designated by the read pointer RP supplied from the pointer control unit 44. Then, the memory controller 47 supplies the read trace packet TP to the trace data output unit 50 (step SD10). As a result, the trace data output unit 50 converts the trace packet TP supplied from the memory controller 50 into 4-bit parallel trace data, and writes this 4-bit parallel trace data into a predetermined storage area of the external storage apparatus 13, and thereafter supplies the pointer update request signal $RNE_2$ to the pointer control unit 48. As a consequence, the pointer control unit 48 updates the read pointer RP in the trace packet memory 43 in response to the pointer update request signal $RNE_2$, and also notifies the updated read pointer RP to the comparing unit 49. Also, the pointer control unit 48 supplies the detection instruction signal DEC to the historical information detection unit 44 (step SD11). As a consequence, the historical information detecting unit 44 again judges as to whether or not the count value of the PC 15a and the historical information are supplied from the CPU 15 in response to the detection instruction signal DEC supplied from the pointer control unit 48 (step SD1).

To the contrary, in the case that the judgment result of the step SD9 is "NO", namely when the overflow packet OFP has not yet been written into the trace packet memory 43, the overflow control unit 46 notifies this overflow packet writing condition to the comparing unit 49. As a result, this comparing unit 49 judges as to whether or not the overflow packet OFP can be written (step SD12). This judgment may be realized by checking, for example, as to whether or not a difference between (maximum value MAD of address—write pointer WP), or the read pointer RP is larger than, or equal. to 8. When the judgment result of the step SD12 is "YES", the comparing unit 49 notifies this judgment result to the overflow control unit 46. As a result, the overflow control unit 46 produces the overflow packet OFP to supply this overflow packet OFP to the memory controller 47, and also supplies the pointer update request signal $RNE_1$ to the pointer control unit 48. The memory controller 47 writes the overflow packet OFP supplied from the overflow control unit 16 into a storage area of the trace packet memory 43 (step SD13). This storage area of the trace packet memory 43 is designated by the write pointer WP supplied from the pointer control unit 48. Also, the pointer control unit 48 updates the write pointer WP in the trace packet memory 43 in response to the pointer update request signal $RNE_1$ supplied from the overflow control unit 46, and also notifies the write pointer WP to the memory controller 47 and the comparing unit 49. Furthermore, the pointer control unit 48 supplies the detection instruction signal DEC to the historical information detecting unit 44 (step SD14). Then, the historical information detecting unit 24 judges as to whether or not the count value of the PC 15a and the historical information are supplied from the CPU 15 based on the detection instruction signal DEC supplied from the pointer control unit 48 (step SD1).

On the other hand, in such a case that the judgment result of the step SD12 is "NO", namely when the overflow packet OFP cannot be written, the comparing unit 49 notifies this fact to both the overflow control unit 46 and the memory controller 47. As a consequence, the memory controller 47 reads out the trace packet TP from the storage area of the trace packet memory 43, and then supplies this read trace packet TP to the trace data output unit 50 (step SD15). This storage area of the trace packet memory 43 is designated by the read pointer RP supplied from the pointer control unit 48. As a result, the trace data output unit 50 converts the trace packet TP supplied from the memory controller 47 into the 4-bit parallel trace data, and writes this 4-bit parallel trace data into a preselected storage area of the external storage apparatus 13. Thereafter, this trace data output unit 50 supplies the pointer update request signal $RNE_2$ to the pointer control unit 48. As a consequence, the pointer control unit 48 updates the read pointer RP in the trace packet memory 43, and also notifies this updated read pointer RP to the comparing unit 49 (step SD16). Then, in such a case that the difference (MAD-WP) between the maximum address value MAD and the write pointer WP, or the read pointer RP becomes larger than, or equal to 8 by executing the trace data reading operation from the trace packet memory 43 and the trace data writing operation into the external storage apparatus 13, the comparing unit 49 may judge that the overflow packet OFP can be written, and then notifies this fact to the overflow control unit 46. As a consequence, the process operations defined at the step SD13 and the step SD14.

As previously described in detail, in accordance with the third program checking apparatus, a similar advantage to that of the second program checking apparatus may be achieved in addition to the below-mentioned advantages. That is, in this third program checking apparatus, the shift register functioning as the storage means for storing thereinto the trace packet TP is employed. Instead of this shift register, general-purpose semiconductor memories such as a DRAM and a SRAM may be employed. If the same storage capacity may be sufficiently used, then the IC chip area of the CPU chip 41 may be reduced, as compared with the second program checking apparatus with employment of the above-described shift register. Conversely, if the same chip area is used, then the resultant storage capacity may be increased, so that a total number of acquirable historical information may be increased.

While the present invention has been described in detail with reference to the drawings, the present invention is not limited to the above-explained embodiments, but may be modified, changed, and substituted without departing from the technical spirit and scope of the present invention.

For example, in the first to third embodiments, the CPU 15 executes all aspects of the target program, and the trace means executes the trace process operation. However, the present invention is not limited to the above embodiments. Generally speaking, a target program is constituted by a standardized process operation in which a program check has been executed, and a non-standardized process operation specific to this target program, in which a program check has not yet been accomplished. In the standardized process operation, the target program is arranged by such commands which can be executed by the CPU 15 without any interpretation, so that these commands can be executed in high speed. Also, since the program check is completed, no trace process operation is longer required. In contrast, in the non-standardized process operation, since the process operation is specifically designed to this target program, the CPU 15 must interpret/execute the commands one by one. Furthermore, since the program cheek has no yet been accomplished, the trace process operation must be carried out.

Under such a circumstance, the following alternative arrangement may be conceived. For instance, an input means is newly employed by which a user may designate a desirable trace process execution portion, and the CPU 15 may execute the standardized process operation contained in the target program in high speed and further may execute the non-standardized process operation contained in this target program by interpreting the commands one by one. In conjunction with the above-explained operation, the trace means may execute only trace process operation portion designated by the user. When such an alternative arrangement is employed, the overflow occurrence frequency could be reduced at which the trace buffer 17 for storing the trace packet, the trace packet storage unit 23, and the trace packet memory 43 are brought into overflow status. As a result, the time duration during which the trace process operation is interrupted may be shortened. Accordingly, the entire processing time involving the trace processing time for the target program may be shortened.

Also, in the above-described first to third embodiments, the trace processing operations is carried out only 1 time. On the other hand, normally, such a trace processing operation is required to be executed several times in order to completely remove program bugs under such a circumstance, the following trace processing operations mayby alternatively required. That is, no tracing process operation is carried out as to a program portion among a target program, in which no trace problem occurred in the previous trace process operation. To the contrary, the marking trace processing operation is carried out with respect to a program portion where an abnormal condition happens to occur, and/or another program portion where the trace packet TP could not be stored in the trace buffer 17, since the trace buffer 17 was brought into the overflow state during the previous trace processing operation. To this end, for example, while the historical information and the like acquired in the previous trace processing operation may be stored into a predetermined storage means, the above-described user may designate a trace process desirable portion within the target program. As a result, although the target program is executed, the trace processing operation is omitted at such a program portion that the program can be operated under normal condition (for instance, such data stored in a preselected portion of the data storage unit 11b is merely loaded on the register for constituting the target register unit 14, or is merely transferred to another storage portion of the data storage unit 11b, or an external electronic appliance). Based upon the previous historical information, the content of the target register unit 14 and also the content of the data storage unit 11b are set to such a condition immediately before the program portion designated by the user is executed by the trace process operation. Immediately, the trace processing operation for this relevant program portion is carried out. With employment of such an alternative arrangement, the target program can be simply checked in high speed.

Furthermore, in the first to third program checking apparatuses, any of the structural elements are constructed in the hardware form. However, the present invention is not limited to this hardware construction. That is, the above-explained program checking apparatus may be alternatively arranged by a computer, a sub-CPU, and a storage medium. Concretely speaking, this computer may be constituted by a main CPU, a sub-CPU, an internal storage device such as a ROM and a RAM, and an external storing apparatus such as an FDD (floppy disk driver), an HDD (hard disk driver), and a CD-ROM driver, and furthermore, an input/output means. The above-explained historical information detecting units 24/44, trace packet producing units 25/45, overflow control units 27/46, comparing units 26/49, pointer control units 28/48, trace data output units 29/50, and a memory controller 47 are realized by the sub-CPU. The various functions realized by the CPU and the sub-CPU may be stored as a target program checking program into a semiconductor memory such as a ROM, an/or other storage media, e.g., and FD, an HD, and a CD-ROM. In this alternative apparatus, either the above-described internal storage device or the external storage apparatus may constitute the target memory unit 11, the target register unit 14, the trace buffer 17, the trace packet storage unit 23, and the trace packet memory 43. The target program checking program is read out by the CPU, or sub-CPU from the storage media so as to control the various operations of the CPU and the sub-CPU. When the target program checking program is initiated, the sub-CPU may function as the above-described historical information detecting units 24/44, trace packet producing units 25/45, overflow control units 27/46, comparing units 26/49, pointer control units 28/48, trace data output units 29/50, and also memory controller 47. Then, this sub-CPU may execute the above-described process operations under control of this target program checking program.

In addition, in the first to third program checking apparatuses, the bit length of the trace packet is selected to be 8 bits, or 40 bits. The present invention is not limited to this bit length. Alternatively, other bit lengths capable of indicative of the historical information, the count value of PC, and the occurrence of overflow may be apparently used.

As previously described in detail, in accordance with the program checking apparatus of the present invention, the historical information related to the major, or significant target program portions can be acquired while the execution of the target program by the CPU is not interrupted. Also, the trace interrupt time can be shortened and the trace-interrupted program portion can be specified. As a consequence, it is possible to acquire such historical information required to check the target program, and furthermore to simply check the target program in high speed.

Also, since the historical information is outputted from the terminals other than the terminal for the address bus and the data bus, even when a high-speed CPU is employed, the necessary historical information can be acquired without deforming the waveforms of the signals appearing in the address bus and the data bus. Also, since the trace means is arranged within the CPU chip, even when the cache memory circuit is contained in the program checking apparatus, the access historical information hit on this cache memory circuit can be traced.

It is thus apparent that the present invention is not limited to the above embodiments but may be changed and modified without departing from the scope and spirit of the invention.

Finally, the present application claims the priority of Japanese Patent Application No.Hei10-118969 filed on Apr. 23, 1998, which is herein incorporated by reference.

What is claimed is:

1. A program checking apparatus for executing a target program so as to acquire historical data produced by executing said target program and for checking said target program based upon said acquired historical data, said target program being originally executed by a central processing unit for constituting a system under development, comprising:

first and second storage means for storing thereinto said historical data; and trace means operable in such a case that said target program is executed by said program checking apparatus to thereby acquire said historical data in such a manner that when said first storage means owns a storage capacity capable of storing said historical data, said trace means causes said first storage means to temporarily store thereinto said acquired historical data; when said first storage means does not have said storable storage capacity, said trace means reads all of the historical data stored in said first storage means and then causes said second storage means to store thereinto all of the read historical data, and thereafter stores store-impossible information into said first storage means, said store-impossible information indicating that said historical data itself cannot be stored into said first storage means; and when said acquired historical data is not supplied to said trace means, said trace means reads both said historical data and said store-impossible information stored in said first storage means to thereby store both data into said second storage means.

2. A program checking apparatus according to claim 1, further comprising:

a target memory unit constituted by a target program storage unit for storing thereinto said target program, and a data storage unit for storing thereinto program execution data.

3. A program checking apparatus according to claim 1 wherein:
said first storage means is constituted by a trace buffer register;
said second storage means is constituted by an external storage apparatus; and
said trace means and said trace buffer register are built in a CPU (central processing unit) chip.

4. A program checking apparatus according to claim 3 wherein:
said trace means acquires said historical data, and converts said acquired historical data into a trace packet, and also causes said trace buffer register to store thereinto said trace packet.

5. A program checking apparatus according to claim 4 wherein:
said trace means converts the acquired historical data into a plurality of trace packets, and each of said plural trace packets is made of plural bits.

6. A program checking apparatus for executing a target program so as to acquire historical data produced by executing said target program and for checking said target program based upon said acquired historical data, said target program being originally executed by a central processing unit for constituting a system under development, comprising:
first and second storage means for storing thereinto said historical data; and
trace means operable in such a case that said target program is executed by said program checking apparatus to thereby acquire said historical data in such a manner that when said first storage means owns a first storage capacity capable of storing said historical data, said trace means causes said first storage means to temporarily store thereinto said acquired historical data; when said first storage means does not have said first storage capacity, but owns a second storage capacity capable of storing storage-impossible information, said trace means causes said first storage means to temporarily store thereinto said storage-impossible information, said store-impossible information indicating that said historical data itself cannot be stored into said first storage means; and when said first storage means does not have even said second storage capacity, said trace means is brought into a wait state until said second storage capacity can be secured therein, and thereafter causes said first storage means to store thereinto said storage-impossible information, and also reads both said historical data and said store-impossible information stored in said first storage means to thereby store both data into said second storage means.

7. A program checking apparatus according to claim 6 wherein:
said first storage means is arranged by series-connecting a plurality of shift registers to each other, said shift registers being constituted by series-connecting a plurality of flip-flops to each other; and
said trace means includes at least:
a comparing unit for comparing bit lengths of said historical data and of said store-impossible information with a pointer in order to judge as to whether or not both said historical data and said storage-impossible information can be stored into said first storage means, said pointer indicating an address of a least significant bit of information which should be subsequently stored into said first storage means.

8. A program checking apparatus according to claim 7, wherein:
said trace means acquires said historical data, and converts said acquired historical data into a trace packet, and also causes said series-connected shift registers to store thereinto said trace packet.

9. A program checking apparatus according to claim 8 wherein:
said trace means converts the acquired historical data into a plurality of trace packets, and each of said plural trace packets is made of plural bits.

10. A program checking apparatus according to claim 6, further comprising:
a target memory unit constituted by a target program storage unit for storing thereinto said target program, and a data storage unit for storing thereinto program execution data.

11. A program checking apparatus for executing a target program so as to acquire historical data produced by executing said target program and for checking said target program based upon said acquired historical data, said target program being originally executed by a central processing unit for constituting a system under development, comprising:
first and second storage means for storing thereinto said historical data; and
trace means operable in such a case that said target program is executed by said program checking apparatus to thereby acquire said historical data in such a manner that when said first storage means owns a first storage capacity capable of storing said historical data, said trace means causes said first storage means to temporarily store thereinto said acquired historical data; when said first storage means does not have said first storable storage capacity, but owns a second storage capacity capable of storing storage-impossible information, said trace means causes said first storage means to temporarily store thereinto said storage-impossible information, said store-impossible information indicating that said historical data itself cannot be stored into said first storage means; and when said first storage means does not have even said second storage capacity, said trace means reads both said historical data and said store-impossible information from said first storage means until said first storage means can own said second storage capacity, and then stores both the read historical data and store-impossible information into said second storage means; and thereafter when said acquired historical data is not supplied to said trace means, said trace means reacts both said historical data and said store-impossible information stored in said first storage means to thereby store both data into said second storage means.

12. A program checking apparatus according to claim 11 wherein:
said first storage means is arranged by a semiconductor memory; and
said trace means includes at least:
a comparing unit for comparing bit lengths of said historical data and of said store-impossible information with a pointer in order to judge as to whether or not both said historical data and said storage-impossible information can be stored into said first storage means, said pointer indicating any one of a first pointer for representing an address of an MSB (most significant) bit of such information which should be subsequently read out from said first storage means, and a difference between a maximum address of said first storage means and a second pointer for representing an address of an MSB of such information which should be subsequently stored into said first storage means.

13. A program checking apparatus according to claim 12, wherein:
said trace means acquires said historical data, and converts said acquired historical data into a trace packet, and also causes said semiconductor memory to store thereinto said trace packet.

14. A program checking apparatus according to claim 13 wherein:
said trace means converts the acquired historical data into a plurality of trace packets, and each of said plural trace packets is made of plural bits.

15. A program checking apparatus according to claim 11, further comprising:
a target memory unit constituted by a target program storage unit for storing thereinto said target program, and a data storage unit for storing thereinto program execution data.

16. A method for checking a target program by using a program checking apparatus having first and second storage means, for executing said target program so as to acquire historical data produced by executing said target program and for checking said target program based upon said acquired historical data, said target program being originally executed by a central processing unit for constituting a system under development, comprising:
a first step where when said first storage means owns a storage capacity capable of storing said historical data, said acquired historical data is temporarily stored into said first storage means;
a second step where when said first storage means does not have said storable storage capacity, all of said historical data stored in said first storage means are read from first storage means to be stored into said second storage means, and thereafter store-impossible information is stored into said first storage means, said store-impossible information indicating that said historical data itself cannot be stored into said first storage means; and
a third step where when said historical data is not supplied, both said historical data and said store-impossible information are read out from said first storage means to be stored into said second storage means.

17. A target program checking method according to claim 16, further comprising:
a fourth step for converting said acquired historical data into a trace packet to be stored into said first storage means.

18. A target program checking method according to claim 16, further comprising:
a fourth step for converting said acquired historical data into a plurality of trace packets, each of said plural trace packets being made of plural bits.

19. A target program checking method according to claim 16 wherein:
said historical data is constituted by an address of a branch source and an address of a branch destination when each of interrupt, exception, and branch occurs; an accessed data value; and an address where the data is stored.

20. A target program checking method according to claim 16 wherein:

said historical data is replaced by a code indicative of a sort of said historical data;
said store-impossible information is replaced by a code indicative of said store-impossible information.

21. A method for checking a target program by using a program checking apparatus having first and second storage means, for executing said target program so as to acquire historical data produced by executing said target program and for checking said target program based upon said acquired historical data, said target program being originally executed by a central processing unit for constituting a system under development, comprising:
a first step where when said first storage means owns a first storage capacity capable of storing said historical data, said acquired historical data is temporarily stored into said first storage means;
a second step where when said first storage means does not have said first storable storage capacity, but owns a second storage capacity capable of storing store-impossible information, said store-impossible information is temporarily stored into said first storage means, said store-impossible information indicating that said historical data itself cannot be stored into said first storage means;
a third step where when said first storage means does not have even said second storage capacity, said first storage means is brought into a wait state until said second storage capacity can be secured therein, and thereafter, said store-impossible information is stored into said first storage means; and
a fourth step where both said historical data and said store-impossible information are read out from said first storage means to be stored into said second storage means.

22. A target program checking method according to claim 21, further comprising:
a fifth step for comparing bit lengths of said historical data and of said store-impossible information with a pointer in order to judge as to whether or not both said historical data and said storage-impossible information can be stored into said first storage means, said pointer indicating an address of a least significant bit of information which should be subsequently stored into said first storage means.

23. A target program checking method according to claim 21, further comprising:
a sixth step for converting said acquired historical data into a trace packet to be stored into said first storage means.

24. A target program checking method according to claim 21, further comprising:
a sixth step for converting said acquired historical data into a plurality of trace packets, each of said plural trace packets being made of plural bits.

25. A target program checking method according to claim 21 wherein:
said historical data is constituted by an address of a branch source and an address of a branch destination when each of interrupt, exception, and branch occurs; an accessed data value; and an address where the data is stored.

26. A target program checking method according to claim 21 wherein:
said historical data is replaced by a code indicative of a sort of said historical data;

said store-impossible information is replaced by a code indicative of said store-impossible information.

27. A method for checking a target program by using a program checking apparatus having first and second storage means, for executing said target program so as to acquire historical data produced by executing said target program and for checking said target program based upon said acquired historical data, said target program being originally executed by a central processing unit for constituting a system under development, comprising:

a first step where when said first storage means owns a first storage capacity capable of storing said historical data, said acquired historical data is temporarily stored into said first storage means;

a second step where when said first storage means does not have said first storable storage capacity, but owns a second storage capacity capable of storing store-impossible information, said store-impossible information is temporarily stored into said first storage means, said store-impossible information indicating that said historical data itself cannot be stored into said first storage means;

a third step where when said first storage means does not have even said second storage capacity, both said historical data and said store-impossible information are read out from said first storage means to be thereafter stored into said second storage means until said second storage capacity can be secured in said first storage means; and a fourth step where when said historical data is not supplied, both said historical data and said store-impossible information are read out from said first storage means to be stored into said second storage means.

28. A target program checking method according to claim 27, further comprising:

a fifth step for comparing bit lengths of said historical data and of said store-impossible information with a pointer in order to judge as to whether or not both said historical data and said storage-impossible information can be stored into said first storage means, said pointer indicating an address of a least significant bit of information which should be subsequently stored into said first storage means.

29. A target program checking method according to claim 27, further comprising:

a fifth step for converting said acquired historical data into a trace packet to be stored into said first storage means.

30. A target program checking method according to claim 27, further comprising:

a fifth step for converting said acquired historical data into a plurality of trace packets, each of said plural trace packets being made of plural bits.

31. A target program checking method according to claim 27 wherein:

said historical data is constituted by an address of a branch source and an address of a branch destination when each of interrupt, exception, and branch occurs; an accessed data value; and an address where the data is stored.

32. A target program checking method according to claim 27 wherein:

said historical data is replaced by a code indicative of a sort of said historical data;

said store-impossible information is replaced by a code indicative of said store-impossible information.

33. A computer-readable recording medium for recording thereon a target program checking program, wherein:

said target program checking program is checked by a program checking apparatus for executing a target program so as to acquire historical data produced by executing said target program and for checking said target program based upon said acquired historical data, said target program being originally executed by a central processing unit for constituting a system under development, comprising:

first and second storage means for storing thereinto said historical data; and trace means operable in such a case that said target program is executed by said program checking apparatus to thereby acquire said historical data in such a manner that when said first storage means owns a storage capacity capable of storing said historical data, said trace means causes said first storage means to temporarily store thereinto said acquired historical data; when said first storage means does not have said storable storage capacity, said trace means reads all of the historical data stored in said first storage means and then causes said second storage means to store thereinto all of the read historical data, and thereafter stores store-impossible information into said first storage means, said store-impossible information indicating that said historical data itself cannot be stored into said first storage means; and when said acquired historical data is not supplied to said trace means, said trace means reads both said historical data and said store-impossible information stored in said first storage means to thereby store both data into said second storage means.

34. A computer-readable recording medium for recording thereon a target program checking program, wherein:

said target program checking program is checked by a program checking apparatus for executing a target program so as to acquire historical data produced by executing said target program and for checking said target program based upon said acquired historical data, said target program being originally executed by a central processing unit for constituting a system under development, comprising:

first and second storage means for storing thereinto said historical data; and trace means operable in such a case that said target program is executed by said program checking apparatus to thereby acquire said historical data in such a manner that when said first storage means owns a first storage capacity capable of storing said historical data, said trace means causes said first storage means to temporarily store thereinto said acquired historical data; when said first storage means does not have said first storage capacity, but owns a second storage capacity capable of storing storage-impossible information, said trace means causes said first storage means to temporarily store thereinto said storage-impossible information, said store-impossible information indicating that said historical data itself cannot be stored into said first storage means; and when said first storage means does not have even said second storage capacity, said trace means is brought into a wait state until said second storage capacity can be secured therein, and thereafter causes said first storage means to store thereinto said storage-impossible information, and also reads both said historical data and said store-impossible information stored in said first storage means to thereby store both data into said second storage means.

35. A computer-readable recording medium for recording thereon a target program checking program, wherein:

said target program checking program is checked by a program checking apparatus for executing a target program so as to acquire historical data produced by executing said target program and for checking said target program based upon said acquired historical data, said target program being originally executed by a central processing unit for constituting a system under development, comprising:

first and second storage means for storing thereinto said historical data; and trace means operable in such a case that said target program is executed by said program checking apparatus to thereby acquire said historical data in such a manner that when said first storage means owns a first storage capacity capable of storing said historical data, said trace means causes said first storage means to temporarily store thereinto said acquired historical data; when said first storage means does not have said first storable storage capacity, but owns a second storage capacity capable of storing storage-impossible information, said trace means causes said first storage means to temporarily store thereinto said storage-impossible information, said store-impossible information indicating that said historical data itself cannot be stored into said first storage means; and when said first storage means does not have even said second storage capacity, said trace means reads both said historical data and said store-impossible information from said first storage means until said first storage means can own said second storage capacity, and then stores both the read historical data and store-impossible information into said second storage means; and thereafter when said acquired historical data is not supplied to said trace means, said trace means reads both said historical data and said store-impossible information stored in said first storage means to thereby store both data into said second storage means.

* * * * *

UNITED STATES PATENT AND TRADEMARK OFFICE
CERTIFICATE OF CORRECTION

PATENT NO. : 6,321,290 B1
DATED : November 20, 2001
INVENTOR(S) : Yamashita

It is certified that error appears in the above-identified patent and that said Letters Patent is hereby corrected as shown below:

Column 32,
Line 50, "reacts" should read -- reads --

Signed and Sealed this

Ninth Day of July, 2002

Attest:

Attesting Officer

JAMES E. ROGAN
Director of the United States Patent and Trademark Office